United States Patent
Chen et al.

(10) Patent No.: US 12,131,521 B2
(45) Date of Patent: Oct. 29, 2024

(54) IMAGE CLASSIFICATION METHOD AND APPARATUS

(71) Applicant: HUAWEI TECHNOLOGIES CO., LTD., Guangdong (CN)

(72) Inventors: Hanting Chen, Beijing (CN); Yunhe Wang, Beijing (CN); Chunjing Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 17/587,284

(22) Filed: Jan. 28, 2022

(65) Prior Publication Data

US 2022/0157046 A1    May 19, 2022

Related U.S. Application Data

(63) Continuation of application No. PCT/CN2020/105869, filed on Jul. 30, 2020.

(30) Foreign Application Priority Data

Jul. 30, 2019  (CN) .......................... 201910695762.0

(51) Int. Cl.
*G06V 10/764* (2022.01)
*G06F 17/16* (2006.01)
(Continued)

(52) U.S. Cl.
CPC ............ *G06V 10/764* (2022.01); *G06F 17/16* (2013.01); *G06N 3/02* (2013.01); *G06V 10/7715* (2022.01); *G06V 10/82* (2022.01)

(58) Field of Classification Search
CPC .. G06V 10/764; G06V 10/7715; G06V 10/82; G06F 17/16; G06F 18/241;
(Continued)

(56) References Cited

U.S. PATENT DOCUMENTS

2008/0172386 A1   7/2008  Ammar et al.
2018/0211157 A1*  7/2018  Liu .................. G06T 3/4007
(Continued)

FOREIGN PATENT DOCUMENTS

CN    106250911 A    12/2016
CN    107004142 A    8/2017
(Continued)

OTHER PUBLICATIONS

Baluja et al., "No Multiplication? No Floating Point? No Problem! Training Networks for Efficient Inference," arXiv Pre-print, arXiv:1809.09244v2, Sep. 28, 2018, 13 pages.
(Continued)

*Primary Examiner* — Ping Y Hsieh
*Assistant Examiner* — Jose M Torres
(74) *Attorney, Agent, or Firm* — Fish & Richardson P.C.

(57) ABSTRACT

This application relates to an image recognition technology in the field of computer vision of artificial intelligence, and provides an image classification method and apparatus. An example method includes obtaining an input feature map of a to-be-processed image, and then performing feature extraction processing on the input feature map based on a feature extraction kernel of a neural network to obtain an output feature map, where each of a plurality of output sub-feature maps is determined based on the corresponding input sub-feature map and the feature extraction kernel, at least one of the output sub-feature maps is determined based on a target matrix obtained after an absolute value is taken, and a difference between the target matrix and the input sub-feature map corresponding to the target matrix is the feature extraction kernel. The to-be-processed image is classified based on the output feature map to obtain a classification result of the to-be-processed image.

20 Claims, 7 Drawing Sheets

(51) Int. Cl.
  *G06N 3/02* (2006.01)
  *G06V 10/77* (2022.01)
  *G06V 10/82* (2022.01)
(58) Field of Classification Search
  CPC .......... G06N 3/02; G06N 3/045; G06N 3/048;
                 G06N 3/063; G06N 3/084
  See application file for complete search history.

(56) References Cited

U.S. PATENT DOCUMENTS

| | | | | |
|---|---|---|---|---|
| 2018/0336468 | A1* | 11/2018 | Kadav | G06V 10/454 |
| 2019/0228264 | A1 | 7/2019 | Huang et al. | |
| 2021/0124990 | A1* | 4/2021 | Lian | G06N 3/084 |
| 2021/0224581 | A1* | 7/2021 | Wu | G06V 10/806 |
| 2021/0358082 | A1* | 11/2021 | Zhu | G06T 3/4046 |

FOREIGN PATENT DOCUMENTS

| | | | |
|---|---|---|---|
| CN | 107358262 A | 11/2017 | |
| CN | 109165675 A | 1/2019 | |
| CN | 109886321 A | 6/2019 | |
| CN | 109886390 A | 6/2019 | |
| EP | 3496008 B1 * | 10/2023 | ............. G06F 17/15 |

OTHER PUBLICATIONS

Cintra et al., "Low-Complexity Approximate Convolutional Neural Networks," IEEE Transactions on Neural Networks and Learning Systems, vol. 29, No. 12, Dec. 2018, 12 pages.

Elhoushi et al., "DeepShift: Towards Multiplication-Less Neural Networks," arXiv Pre-print, arXiv:1905.13298v2, Jun. 6, 2019, 11 pages.

Extended European Search Report issued in European Application No. 20848555.7 on Jul. 21, 2022, 11 pages.

PCT International Search Report and Written Opinion issued in International Application No. PCT/CN2020/105869 on Nov. 6, 2020, 15 pages (with English translation).

* cited by examiner

FIG. 7

IMAGE CLASSIFICATION METHOD AND APPARATUS

CROSS-REFERENCE TO RELATED APPLICATIONS

This application is a continuation of International Application No. PCT/CN2020/105869, filed on Jul. 30, 2020, which claims priority to Chinese Patent Application No. 201910695762.0, filed on Jul. 30, 2019. The disclosures of the aforementioned applications are hereby incorporated by reference in their entireties.

TECHNICAL FIELD

This application relates to the field of artificial intelligence, and more specifically, to an image classification method and an apparatus.

BACKGROUND

Computer vision is an integral part of various intelligent/autonomous systems in various application fields, for example, manufacturing, inspection, document analysis, medical diagnosis, and military. Computer vision is about how to use a camera/a video camera and a computer to obtain required data and information of a photographed object. Figuratively, computer vision equips the computer with an eye (the camera/the video camera) and a brain (an algorithm) to recognize, track, and measure an object in place of human eyes, so that the computer can perceive an environment. Because perception may be considered as extracting information from a sensory signal, computer vision may also be considered as a science of studying how to enable an artificial system to perform "perception" on an image or multi-dimensional data. Generally, computer vision uses various imaging systems to obtain input information in place of a visual organ and then uses the computer to process and explain the input information in place of a brain. An ultimate research goal of computer vision is to enable the computer to observe and understand the world as human beings through a visual sense and have a capability of autonomously adapting to the environment.

Image (or picture) classification is a basis for various image processing applications. Computer vision often relates to how to classify an obtained image. With rapid development of artificial intelligence technologies, a convolutional neural network (convolutional neural network, CNN) based on deep learning is increasingly widely used in image classification processing. However, both a quantity of parameters included in the convolutional neural network and a calculation amount are large, and a terminal device has very limited computing resources and does not have a strong calculation capability. Consequently, it is difficult to deploy the convolutional neural network on the terminal device.

Therefore, how to reduce calculation overheads of the neural network becomes a problem that needs to be resolved urgently.

SUMMARY

This application provides an image classification method and apparatus, to reduce calculation overheads of a convolutional neural network model used for image classification.

According to a first aspect, an image classification method is provided, where the method includes: obtaining an input feature map of a to-be-processed image, where the input feature map includes the plurality of input sub-feature maps; performing feature extraction processing on the input feature map based on a feature extraction kernel of a neural network, to obtain an output feature map, where the output feature map includes the plurality of output sub-feature maps, each of the plurality of output sub-feature maps is determined based on the corresponding input sub-feature map and the feature extraction kernel, at least one of the output sub-feature maps is determined based on a target matrix obtained after an absolute value is taken, and a difference between the target matrix and the input sub-feature map corresponding to the target matrix is the feature extraction kernel; and classifying the to-be-processed image based on the output feature map, to obtain a classification result of the to-be-processed image.

In this application, at least one of the output sub-feature maps is determined based on the target matrix obtained after the absolute value is taken, and the difference between the target matrix and the input sub-feature map corresponding to the target matrix is the feature extraction kernel. In other words, the target matrix is obtained by performing matrix addition or matrix subtraction on at least one of the input sub-feature maps and the feature extraction kernel, and calculation overheads of an addition operation or a subtraction operation on a computer are less than calculation overheads of a multiplication operation. Therefore, this reduces calculation overheads of a convolutional neural network model used for image classification.

With reference to the first aspect, in some implementations of the first aspect, the target matrix is obtained by performing matrix addition or matrix subtraction on at least one of the input sub-feature maps and the feature extraction kernel.

With reference to the first aspect, in some implementations of the first aspect, the at least one of the output sub-feature maps is obtained according to the following formula:

$$Y(m, n, t) = \sum_{i=0}^{d-1}\sum_{j=0}^{d-1}\sum_{k=1}^{c} -|X(m+i, n+j, k) - F(i, j, k, t)|; \text{ or}$$

$$Y(m, n, t) = \sum_{i=0}^{d-1}\sum_{j=0}^{d-1}\sum_{k=1}^{c} -|X(m+i, n+j, k) + F(i, j, k, t)|,$$

where $|(\bullet)|$ is an operation for taking an absolute value, $\Sigma(\bullet)$ is a summation operation, $Y(m,n,t)$ is the at least one of the output sub-feature maps, $Y(m,n,t)$ is an element in an $m^{th}$ row and an $n^{th}$ column on a $t^{th}$ page in the output feature map, $X(m+i,n+j,k)$ is an element in an $i^{th}$ row and a $j^{th}$ column on a $k^{th}$ page in the at least one of the input sub-feature maps, $F(i,j,k,t)$ is an element in an $i^{th}$ row and a $j^{th}$ column on a $k^{th}$ page in the feature extraction kernel, t is a channel quantity of the feature extraction kernel, d is a row quantity of the feature extraction kernel, C is a channel quantity of the input feature map, and d, C, i, j, k, m, n, and t are all integers.

With reference to the first aspect, in some implementations of the first aspect, a gradient of the feature extraction kernel is determined based on the target matrix, and a gradient of the input sub-feature map is determined based on the target matrix.

With reference to the first aspect, in some implementations of the first aspect, when a value of $T(m,n,i,j,k,t)$ falls within a preset value range, a gradient of $F(i,j,k,t)$ is determined based on the value of T(m,n,i,j,k,t), and a gradient of X(m+i,n+j,k) is determined based on the value of T(m,n,i,j,k,t), where T(m,n,i,j,k,t)=X(m+i,n+j,k)±F(i,j,k,t), F(i,j,k,t) is the element in the $i^{th}$ row and the $j^{th}$ column on the $k^{th}$ page in the feature extraction kernel, X(m+i,n+j,k) is the element in the $i^{th}$ row and the $j^{th}$ column on the $k^{th}$ page in the at least one of the input sub-feature maps, and i, j, k, m, n, and t are all integers.

In this application, the gradient of F(i,j,k,t) and the gradient of X(m+i,n+j,k) are determined based on the value of T(m,n,i,j,k,t), so that possible value ranges of the gradient of F(i,j,k,t) and the gradient of X(m+i,n+j,k) can be expanded. Therefore, a value of the gradient of F(i,j,k,t) and a value of the gradient of X(m+i,n+j,k) are more diverse. This facilitates parameter optimization of the neural network model, and improves accuracy of image classification performed by a convolutional neural network module.

Optionally, the output sub-feature map obtained after absolute values of all elements in the target matrix are taken and then summed up is the element in the $m^{th}$ row and the $n^{th}$ column on the $i^{th}$ page in the output feature map.

With reference to the first aspect, in some implementations of the first aspect, the gradient of F(i,j,k,t) is obtained according to the following formula:

$$\frac{\partial Y(m, n, t)}{\partial F(i, j, k, t)} = -\text{Hand tanh}(F(i, j, k, t) \pm X(m + i, n + j, k));$$

and the gradient of X(m+i,n+j,k) is obtained according to the following formula:

$$\frac{\partial Y(m, n, t)}{\partial X(m + i, n + j, k)} = -\text{Hand tanh}(X(m + i, n + j, k) \pm F(i, j, k, t)), \text{ where}$$

$$\text{Hard tanh}(x) = \begin{cases} 1 & x > 1 \\ -1 & x < -1 \\ x & -1 \leq x \leq 1 \end{cases},$$

$\frac{\partial Y(m, n, t)}{\partial F(i, j, k, t)}$ is the gradient of $F(i, j, k, t)$, and $\frac{\partial Y(m, n, t)}{\partial X(m + i, n + j, k)}$ is the gradient of $X(m + i, n + j, k)$.

According to a second aspect, an image classification apparatus is provided, including: an obtaining unit, configured to obtain an input feature map of a to-be-processed image, where the input feature map includes the plurality of input sub-feature maps; a feature extraction unit, configured to perform feature extraction processing on the input feature map based on a feature extraction kernel of a neural network, to obtain an output feature map, where the output feature map includes the plurality of output sub-feature maps, each of the plurality of output sub-feature maps is determined based on the corresponding input sub-feature map and the feature extraction kernel, at least one of the output sub-feature maps is determined based on a target matrix obtained after an absolute value is taken, and a difference between the target matrix and the input sub-feature map corresponding to the target matrix is the feature extraction kernel; and a classification unit, configured to classify the to-be-processed image based on the output feature map, to obtain a classification result of the to-be-processed image.

In this application, at least one of the output sub-feature maps is determined based on the target matrix obtained after the absolute value is taken, and the difference between the target matrix and the input sub-feature map corresponding to the target matrix is the feature extraction kernel. In other words, the target matrix is obtained by performing matrix addition or matrix subtraction on at least one of the input sub-feature maps and the feature extraction kernel, and calculation overheads of an addition operation or a subtraction operation on a computer are less than calculation overheads of a multiplication operation. Therefore, this reduces calculation overheads of a convolutional neural network model used for image classification.

With reference to the second aspect, in some implementations of the second aspect, the target matrix is obtained by performing matrix addition or matrix subtraction on at least one of the input sub-feature maps and the feature extraction kernel.

With reference to the second aspect, in some implementations of the second aspect, the at least one output sub-feature map is obtained according to the following formula:

$$Y(m, n, t) = \sum_{i=0}^{d-1}\sum_{j=0}^{d-1}\sum_{k=1}^{c} -|X(m + i, n + j, k) - F(i, j, k, t)|; \text{ or}$$

$$Y(m, n, t) = \sum_{i=0}^{d-1}\sum_{j=0}^{d-1}\sum_{k=1}^{c} -|X(m + i, n + j, k) + F(i, j, k, t)|,$$

where

|(•)| is an operation for taking an absolute value, Σ(•) is a summation operation, Y(m,n,t) is the at least one of the output sub-feature maps, Y(m,n,t) is an element in an $m^{th}$ row and an $n^{th}$ column on a $t^{th}$ page in the output feature map, X(m+i,n+j,k) is an element in an $i^{th}$ row and a $j^{th}$ column on a $k^{th}$ page in the at least one of the input sub-feature maps, F(i,j,k,t) is an element in an $i^{th}$ row and a $j^{th}$ column on a $k^{th}$ page in the feature extraction kernel, t is a channel quantity of the feature extraction kernel, d is a row quantity of the feature extraction kernel, C is a channel quantity of the input feature map, and d, C, i, j, k, m, n, and t are all integers.

With reference to the second aspect, in some implementations of the second aspect, a gradient of the feature extraction kernel is determined based on the target matrix, and a gradient of the input sub-feature map is determined based on the target matrix.

With reference to the second aspect, in some implementations of the second aspect, when a value of T(m,n,i,j,k,t) falls within a preset value range, a gradient of F(i,j,k,t) is determined based on the value of T(m,n,i,j,k,t), and a gradient of X(m+i,n+j,k) is determined based on the value of T(m,n,i,j,k,t), where T(m,n,i,j,k,t)=X(m+i,n+j,k)±F(i,j,k,t), F(i,j,k,t) is the element in the $i^{th}$ row and the $j^{th}$ column on the $k^{th}$ page in the feature extraction kernel, X(m+i,n+j,k) is the element in the $i^{th}$ row and the $j^{th}$ column on the a page in the at least one of the input sub-feature maps, and i, j, k, m, n, and t are all integers.

In this application, the gradient of F(i,j,k,t) and the gradient of X(m+i,n+j,k) are determined based on the value of T(m,n,i,j,k,t), so that possible value ranges of the gradient of F(i,j,k,t) and the gradient of X(m+i,n+j,k) can be expanded. Therefore, a value of the gradient of F(i,j,k,t) and a value of the gradient of X(m+i,n+j,k) are more diverse. This facilitates parameter optimization of the neural network model, and improves accuracy of image classification performed by a convolutional neural network module.

Optionally, the output sub-feature map obtained after absolute values of all elements in the target matrix are taken and then summed up is the element in the $m^{th}$ row and the $n^{th}$ column on the $t^{th}$ page in the output feature map.

With reference to the second aspect, in some implementations of the second aspect, the gradient of F(i,j,k,t) is obtained according to the following formula:

$$\frac{\partial Y(m, n, t)}{\partial F(i, j, k, t)} = -\text{Hand tanh}(F(i, j, k, t) \pm X(m + i, n + j, k)); \text{ and}$$

the gradient of $X(m + i, n + j, k)$ is obtained according to the following formula:

$$\frac{\partial Y(m, n, t)}{\partial X(m + i, n + j, k)} = -\text{Hand tanh}(X(m + i, n + j, k) \pm F(i, j, k, t)), \text{ where}$$

$$\text{Hard tanh}(x) = \begin{cases} 1 & x > 1 \\ -1 & x < -1 \\ x & -1 \leq x \leq 1 \end{cases},$$

$\frac{\partial Y(m, n, t)}{\partial F(i, j, k, t)}$ is the gradient of $F(i, j, k, t)$, and $\frac{\partial Y(m, n, t)}{\partial X(m + i, n + j, k)}$ is the gradient of $X(m + i, n + j, k)$.

According to a third aspect, an image classification apparatus is provided, where the apparatus includes: a memory, configured to store a program; and a processor, configured to execute the program stored in the memory, and when executing the program stored in the memory, the processor is configured to perform the method in any one of the implementations of the first aspect.

The processor in the third aspect may be a central processing unit (central processing unit, CPU), or may be a combination of a CPU and a neural network operation processor. The neural network operation processor herein may include a graphics processing unit (graphics processing unit, GPU), a neural-network processing unit (neural-network processing unit, NPU), a tensor processing unit (tensor processing unit, TPU), and the like. The TPU is an artificial intelligent accelerator application-specific integrated circuit customized by Google (google) for machine learning.

According to a fourth aspect, a computer-readable medium is provided, where the computer-readable medium stores program code to be executed by a device, and the program code includes instructions used to perform the method in any one of the implementations of the first aspect.

According to a fifth aspect, a computer program product including instructions is provided, where when the computer program product runs on a computer, the computer is enabled to perform the method in any one of the implementations of the first aspect.

According to a sixth aspect, a chip is provided, where the chip includes a processor and a data interface, and the processor reads instructions stored in a memory through the data interface, to perform the method in any one of the implementations of the first aspect.

Optionally, in an implementation, the chip may further include a memory. The memory stores instructions. The processor is configured to execute the instructions stored in the memory. When executing the instructions, the processor is configured to perform the method in any one of the implementations of the first aspect.

The chip may be specifically a field-programmable gate array (field-programmable gate array, FPGA) or an application-specific integrated circuit (application-specific integrated circuit, ASIC).

According to a seventh aspect, an electronic device is provided, where the electronic device includes the image classification apparatus in any aspect of the first aspect, and the electronic device may be specifically a terminal device or a server.

In this application, at least one of the output sub-feature maps is determined based on the target matrix obtained after the absolute value is taken, and the difference between the target matrix and the at least one input sub-feature map is the feature extraction kernel. In other words, the target matrix is obtained by performing matrix addition or matrix subtraction on at least one of the input sub-feature maps and the feature extraction kernel, and calculation overheads of the addition operation or the subtraction operation on the computer are less than the calculation overheads of the multiplication operation. Therefore, this can reduce the calculation overheads of the convolutional neural network model used for image classification.

BRIEF DESCRIPTION OF DRAWINGS

FIG. 7 is a schematic diagram of a feature extraction operation according to another embodiment of this application;

DESCRIPTION OF EMBODIMENTS

Figure 1:
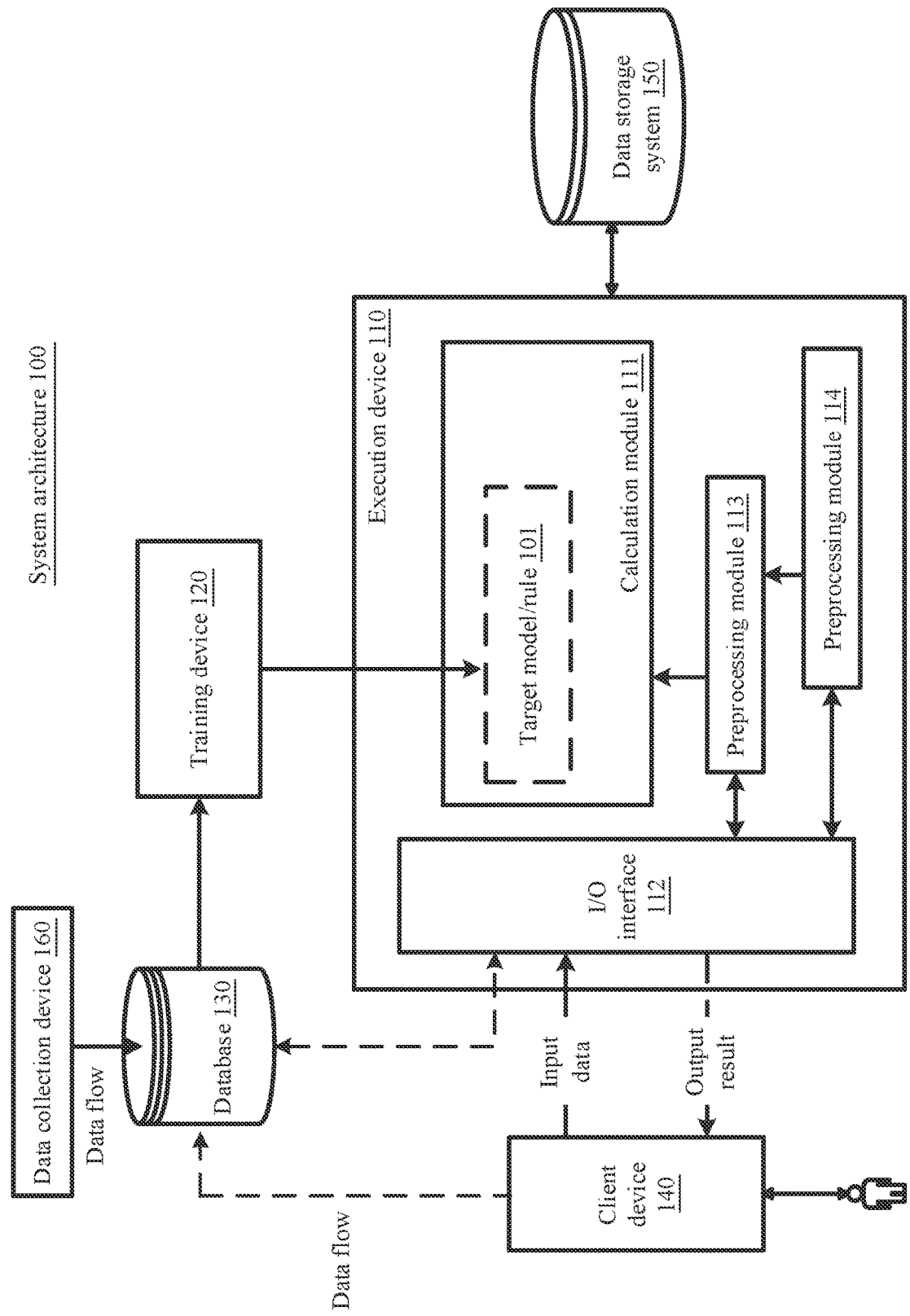
FIG. 1 is a schematic diagram of a system architecture according to an embodiment of this application.

The following describes technical solutions of this application with reference to accompanying drawings.

An image classification method provided in the embodiments of this application can be applied to picture retrieval, album management, Safe City, human computer interaction, and another scenario in which image classification or image recognition is required. It should be understood that an image in the embodiments of this application may be a static image (or referred to as a static picture) or a moving image (or referred to as a moving picture). For example, the image in this application may be a video or a moving picture, or the image in this application may be a static picture or a photo. For ease of description, the static image or the moving image is collectively referred to as an image in the following embodiments of this application.

The image classification method in the embodiments of this application may be specifically applied to an album classification scenario and a photographing recognition scenario. The following describes the two scenarios in detail.

Album Classification:

A user stores a large quantity of pictures on a mobile phone and a cloud disk. User experience can be improved by performing classification management on an album based on a category. An album arranged or stored based on a category can be obtained by classifying a picture in the album by using the image classification method in the embodiments of this application. The picture classification method in the embodiments of this application can be used to facilitate classification management on different categories of objects by the user, thereby facilitating user searching, reducing management time of the user, and improving album management efficiency.

Specifically, when album classification is performed by using the image classification method in the embodiments of this application, a neural network and a feature extraction kernel provided in this application may be used to first extract a picture feature of a picture in an album, classify the picture in the album based on the extracted picture feature to obtain a classification result of the picture, and then classify the picture in the album based on the classification result of the picture, to obtain an album arranged based on a picture category. When the pictures in the album are arranged based on the picture category, pictures belonging to a same category may be arranged in one row or one column. For example, in a finally obtained album, pictures in the first row are all belong to an airplane, and pictures in the second row all belong to a vehicle.

Object Recognition Through Photographing:

During photographing, a user may process a taken photo by using the image classification method in the embodiments of this application, to determine a category of a photographed object through automatic recognition. For example, the user may determine, through automatic recognition, that the photographed object is a flower, an animal, or the like. Further, the image classification method in the embodiments of this application may be used to recognize an object obtained through photographing, to determine, through recognition, a category to which the object belongs. For example, a photo taken by the user includes a shared bicycle. The image classification method in the embodiments of this application may be used to recognize the shared bicycle, to determine, through recognition, that the object belongs to a bicycle. Further, related information of the bicycle may be further displayed.

It should be understood that album classification and object recognition through photographing that are described above are only two specific scenarios to which the image classification method in the embodiments of this application is applied. Application of the image classification method in the embodiments of this application is not limited to the foregoing two scenarios. The image classification method in the embodiments of this application can be applied to any scenario in which image classification or image recognition is required, for example, face recognition. Alternatively, the method in the embodiments of this application may be similarly applied to another field, for example, speech recognition, machine translation, and semantic segmentation.

The embodiments of this application relate to a large amount of related application of the neural network. Therefore, to facilitate better understanding of the solutions of the embodiments of this application, the following first describes related terms and concepts of the neural network that may be used in the embodiments of this application.

(1) Neural Network

The neural network may include neurons. The neuron may be an operation unit with $x_s$ and an intercept 1 as input. Output of the operation unit may be shown by formula (1-1):

$$h_{W,b}(x) = f(W^T x) = f(\Sigma_{s=1}^{n} W_s x_s + b) \quad (1\text{-}1), \text{where}$$

$s = 1, 2, \ldots, n$, n is a natural number greater than 1, $W_s$ is a weight of $x_s$, b is a bias of a neuron, and f is an activation function (activation functions) of the neuron, and is used to introduce a nonlinear characteristic into the neural network, to convert an input signal in the neuron into an output signal. The output signal of the activation function may be used as input of a next convolutional layer. The activation function may be a sigmoid function. The neural network is a network formed by connecting a plurality of the foregoing single neurons together. In other words, an output of a neuron may be an input of another neuron. An input of each neuron may be connected to a local receptive field at a previous layer, to extract a feature in the local receptive field. The local receptive field may be an area that includes several neurons.

(2) Deep Neural Network

The deep neural network (deep neural network, DNN) is also referred to as a multi-layer neural network, and may be understood as a neural network having a plurality of hidden layers. According to locations of different layers of the DNN, neural networks inside the DNN may be classified into three types: an input layer, a hidden layer, and an output layer. Generally, the first layer is the input layer, the last layer is the output layer, and layers in the middle are hidden layers. The layers are fully connected to each other. In other words, any neuron at an $i^{th}$ layer is definitely connected to any neuron at an $(i+1)^{th}$ layer.

Although the DNN appears to be complex, the network is not complex in terms of working of each layer. Briefly, the network is the following linear relationship expression: $\vec{y} = a(W \cdot \vec{x} + \vec{b})$, where $\vec{x}$ is an input vector, $\vec{y}$ is an output vector, $\vec{b}$ is a bias vector, W is a weight matrix (also referred to as a coefficient), and $\alpha(\ )$ is an activation function. Each layer performs only such a simple operation on the input vector $\vec{x}$, to obtain the output vector $\vec{y}$. Because the DNN has a large quantity of layers, a quantity of coefficients W and a quantity of bias vectors $\vec{b}$ are also large. These parameters are defined in the DNN as follows: The coefficient W is used as an example, and it is assumed that a linear coefficient from the fourth neuron at the second layer to the second neuron at the third layer is defined as $W_{24}^{3}$ in a DNN with three layers. A superscript 3 represents a layer at which the coefficient W is located, and a subscript corresponds to an output index 2 at the third layer and an input index 4 at the second layer.

In conclusion, a coefficient from a $k^{th}$ neuron at an $(L-1)^{th}$ layer to a $j^{th}$ neuron at an $L^{th}$ layer is defined as $W_{jk}^{L}$.

It should be noted that the input layer has no parameter W. In the deep neural network, more hidden layers allow the network to show a complex situation in the real world. Theoretically, a model having more parameters is more complex, and has a larger "capacity". This means that the model can complete a more complex learning task. Training the deep neural network is also a process of learning the weight matrix, and a final purpose thereof is to obtain a weight matrix (a weight matrix including vectors W at a plurality of layers) of each layer of the trained deep neural network.

(3) Convolutional Neural Network

The convolutional neural network (convolutional neural network, CNN) is a deep neural network with a convolutional structure. The convolutional neural network includes a feature extractor including a convolutional layer and a sub-sampling layer. The feature extractor may be considered as a filter. The convolutional layer is a neuron layer that is in the convolutional neural network and at which convolution processing is performed on an input signal. At the convolutional layer of the convolutional neural network, a neuron may be connected only to some neurons at a neighboring layer. One convolutional layer usually includes several feature maps, and each feature map may include some rectangularly arranged neurons. Neurons in a same feature map share a weight, and the shared weight herein is a convolution kernel. Sharing a weight may be understood as a manner of extracting image information being unrelated to a location. The convolution kernel may be initialized in a form of a matrix with a random size. In a process of training the convolutional neural network, the convolution kernel may be used to obtain a proper weight through learning. In addition, sharing a weight reduces connections between layers of the convolutional neural network and also reduces a risk of overfitting.

(4) A recurrent neural network (recurrent neural network, RNN) is used to process sequence data. In a conventional neural network model, from an input layer to a hidden layer then to an output layer, layers are fully connected to each other, but nodes at each layer are disconnected. The common neural network is used to overcome many difficulties, but still cannot be used to resolve many problems. For example, during prediction of a next word in a sentence, a previous word is usually used because a previous word and a current word in a sentence are not mutually independent. The RNN is referred to as the recurrent neural network because a current output of a sequence is also related to a previous output. A specific representation form is that the network memorizes previous information and uses the previous information to calculate a current output, that is, nodes at the hidden layer are no longer disconnected but are connected. In addition, an input of the hidden layer includes an output of the input layer and also includes an output that is of the hidden layer and that exists at a previous moment. Theoretically, the RNN can process sequence data with any length. Training of the RNN is the same as training of a conventional CNN or DNN.

If there is already the convolutional neural network, the recurrent neural network is still required for the following simple reason: In the convolutional neural network, it is assumed that elements are mutually independent, and an input and an output are also mutually independent, for example, a cat and a dog. However, many elements are connected to each other in the real world. For example, stocks vary with time. For another example, a person says, "I like to travel, my favorite place is Yunnan, and I will go there if I have the chance." If a blank is to be filled in herein, all human beings should know that "Yunnan" needs to be filled in. A reason is that the human being can infer from the context. However, how can a machine infer information from the context? The RNN emerges. The RNN is intended to enable the machine to have a memorization capability like the human being. Therefore, an output of the RNN needs to depend on current input information and historical memory information.

(5) Loss Function

In a process of training the deep neural network, an output of the deep neural network is expected to approximate as much as possible to a really desired prediction value. Therefore, a current prediction value of the network and a really desired target value may be compared, and then a weight vector of each layer of the neural network may be updated based on a difference between the two values (certainly, an initialization process is usually performed before the first update, that is, a parameter is preconfigured for each layer of the deep neural network). For example, if the prediction value of the network is high, the weight vector is adjusted to obtain a lower prediction value of the network, and is continuously adjusted until the deep neural network can predict the really desired target value or a value very approximate to the really desired target value. Therefore, "how to compare the prediction value with the target value" needs to be predefined, the difference between the prediction value and the target value is a loss function (loss function) or an objective function (objective function), and the function is an important equation used to measure the difference between the prediction value and the target value. The loss function is used as an example. A higher output value (loss) of the loss function indicates a larger difference. In this case, training of the deep neural network becomes a process of reducing the loss as much as possible.

(6) Back Propagation Algorithm

The neural network may correct a value of an initial parameter in a neural network model in a training process according to an error back propagation (back propagation, BP) algorithm, so that a reconstruction error loss of the neural network model becomes increasingly less. Specifically, an input signal is transferred forward until an error loss occurs in an output, and the initial parameter in the neural network model is updated by propagating error loss information backward, so that the error loss converges. The back propagation algorithm is a back propagation operation mainly for the error loss, and is intended to obtain an optimal parameter in the neural network model, for example, a weight matrix.

(7) Pixel Value

A pixel value of an image may be a red green blue (RGB) color value, and the pixel value may be a long integer representing a color. For example, the pixel value is 256*Red+100*Green+76Blue, where Blue represents a blue component, Green represents a green component, and Red represents a red component. In each color component, a smaller value indicates lower brightness, and a larger value indicates higher brightness. For a grayscale image, the pixel value may be a grayscale value.

As shown in FIG. 1, an embodiment of this application provides a system architecture 100. In FIG. 1, a data collection device 160 is configured to collect training data. For the image classification method in the embodiments of this application, the training data may include a training image and a classification result corresponding to the training image, and the classification result of the training image may be a manually pre-labeled result.

After collecting the training data, the data collection device 160 stores the training data into a database 130. A training device 120 obtains a target model/rule 101 through training based on the training data maintained in the database 130.

The following describes a manner in which the training device 120 obtains the target model/rule 101 based on the training data. The training device 120 processes an input original image, and compares an output image with the original image until a difference between the image that is output by the training device 120 and the original image is less than a threshold, to complete training of the target model/rule 101.

The target model/rule 101 can be used to implement the image classification method in the embodiments of this application. In other words, after related preprocessing is performed on a to-be-processed image and the image is input to the target model/rule 101, a classification result of the image may be obtained. The target model/rule 101 in this embodiment of this application may be specifically a neural network. It should be noted that, in actual application, the training data maintained in the database 130 is not necessarily all collected by the data collection device 160, but may be received from another device. In addition, it should be noted that the training device 120 does not necessarily train the target model/rule 101 fully based on the training data maintained in the database 130, but may train the model by obtaining training data from a cloud or another place. The foregoing descriptions should not be used as a limitation on this embodiment of this application.

The target model/rule 101 obtained by the training device 120 through training may be applied to different systems or devices, for example, applied to an execution device 110 shown in FIG. 1. The execution device 110 may be a terminal such as a mobile phone terminal, a tablet computer, a notebook computer, augmented reality (augmented reality, AR)/virtual reality (virtual reality, VR), or an in-vehicle terminal, or may be a server, a cloud, or the like. In FIG. 1, an input/output (input/output, I/O) interface 112 is configured for the execution device 110 to exchange data with an external device. A user may input data to the I/O interface 112 by using a client device 140. The input data in this embodiment of this application may include a to-be-processed image that is input by using the client device.

A preprocessing module 113 and a preprocessing module 114 are configured to preprocess the input data (for example, the to-be-processed image) received by the I/O interface 112. In this embodiment of this application, there may be no preprocessing module 113 and preprocessing module 114 (or there may be only one preprocessing module), and a calculation module 111 is directly configured to process the input data.

In a process in which the execution device 110 preprocesses the input data or the calculation module 111 of the execution device 110 performs related processing such as calculation, the execution device 110 may invoke data, code, and the like in a data storage system 150 for corresponding processing; and may also store, into the data storage system 150, data, instructions, and the like that are obtained through corresponding processing.

Finally, the I/O interface 112 returns a processing result such as the foregoing obtained classification result of the to-be-processed image to the client device 140, to provide the processing result for the user.

It should be noted that the training device 120 may generate, based on different training data, corresponding target models/rules 101 for different objectives or different tasks. The corresponding target models/rules 101 may be used to implement the foregoing objectives or complete the foregoing tasks, thereby providing a desired result for the user.

In the case shown in FIG. 1, the user may manually specify input data, and the input data may be manually specified by using an interface provided by the I/O interface 112. In another case, the client device 140 may automatically send input data to the I/O interface 112. If automatically sending the input data by the client device 140 needs to be authorized by the user, the user may set corresponding permission on the client device 140. The user may view, on the client device 140, a result that is output by the execution device 110. The result may be specifically presented in a specific manner such as display, sound, or an action. The client device 140 may alternatively serve as a data collection end, to collect, as a new sample data, the input data that is input to the I/O interface 112 and the output result that is output from the I/O interface 112 shown in the figure, and store the new sample data into the database 130. Certainly, the client device 140 may not perform collection, but the I/O interface 112 directly stores, as new sample data into the database 130, the input data that is input to the I/O interface 112 and the output result that is output from the I/O interface 112 shown in the figure.

It should be noted that FIG. 1 is only a schematic diagram of a system architecture according to an embodiment of this application. A relationship between locations of a device, a component, a module, and the like shown in the figure constitutes no limitation. For example, in FIG. 1, the data storage system 150 is an external memory relative to the execution device 110. However, in another case, the data storage system 150 may be disposed in the execution device 110.

As shown in FIG. 1, the target model/rule 101 is obtained by the training device 120 through training. The target model/rule 101 in this embodiment of this application may be a neural network in this application. Specifically, the neural network provided in this embodiment of this application may be CNN, a deep convolutional neural network (deep convolutional neural network, DCNN), a recurrent neural network (recurrent neural network, RNN), or the like.

Figure 2:
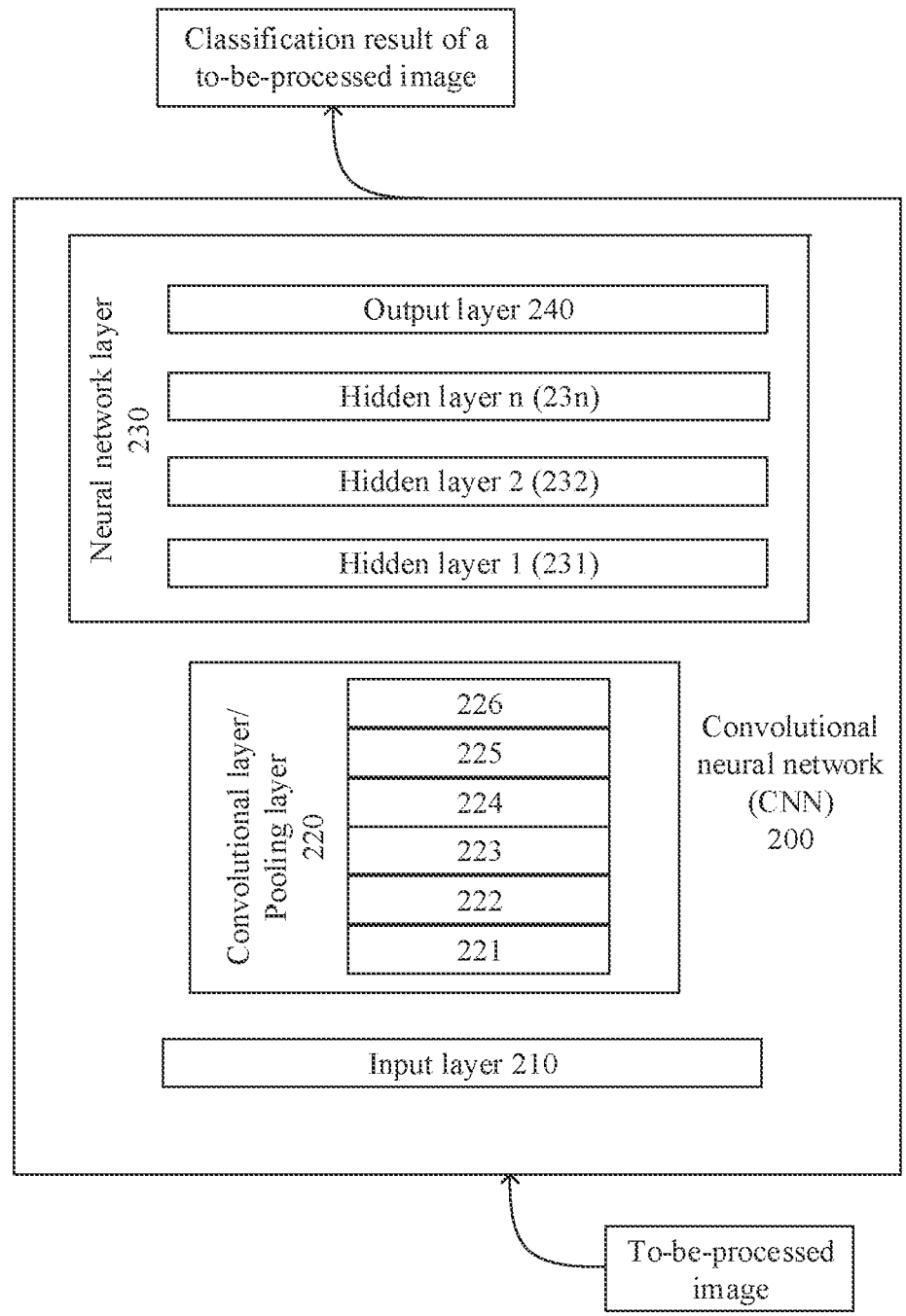
FIG. 2 is a schematic diagram of performing image classification based on a convolutional neural network model according to an embodiment of this application.

Because the CNN is a very common neural network, the following focuses on detailed description of a structure of the CNN with reference to FIG. 2. As described in the descriptions of the foregoing basic concepts, the convolutional neural network is a deep neural network with a convolutional structure, and is a deep learning (deep learning) architecture. The deep learning architecture means performing multi-level learning at different abstraction layers according to a machine learning algorithm. As a deep learning architecture, the CNN is a feed-forward (feed-forward) artificial neural network, and each neuron in the feed-forward artificial neural network may respond to an image that is input into the neuron.

As shown in FIG. 2, a convolutional neural network (CNN) 200 may include an input layer 210, a convolutional layer/pooling layer 220 (where the pooling layer is optional), and a neural network layer 230. The following describes in detail these layers.

Convolutional Layer/Pooling Layer 220:
Convolutional Layer:

As shown in FIG. 2, the convolutional layer/pooling layer 220 may include, for example, layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be specific, an output of a convolutional layer may be used as input of a subsequent pooling layer, or may be used as input of another convolutional layer to continue to perform a convolution operation.

The following uses the convolutional layer 221 as an example to describe internal working principles of the convolutional layer.

The convolutional layer 221 may include a plurality of convolution operators, and the convolution operator is also referred to as a kernel. A function of the convolution operator in image processing is equivalent to a filter for extracting specified information from an input image matrix. The convolution operator may be essentially a weight matrix, and the weight matrix is usually predefined. In a process of performing a convolution operation on an image, the weight matrix is usually used to process pixels on the input image one by one (or two by two . . . which depends on a value of a stride (stride)) in a horizontal direction, to complete extracting a specified feature from the image. A size of the weight matrix should be related to a size of the image. It should be noted that a depth dimension (depth dimension) of the weight matrix is the same as a depth dimension of the input image. In the process of performing the convolution operation, the weight matrix extends to an entire depth of the input image. Therefore, after convolution with a single weight matrix is performed, a convolutional output in a single depth dimension is generated. However, in most cases, the single weight matrix is not used, but a plurality of weight matrices with a same size (row×column), namely, a plurality of isotypic matrices, are used. Outputs of all weight matrices are superposed to form a depth dimension of a convolutional image, and it may be understood that the dimension herein depends on the foregoing "plurality of". Different weight matrices may be used to extract different features from the image, for example, a weight matrix is used to extract edge information of the image, another weight matrix is used to extract a specified color of the image, and still another weight matrix is used to blur unneeded noise in the image. The plurality of weight matrices have a same size (row×column), feature maps extracted by using the plurality of weight matrices with the same size also have a same size, and then the extracted plurality of feature maps with the same size are combined to form an output of the convolution operation.

Weight values in these weight matrices need to be obtained through a large amount of training in actual application. The weight matrices formed by using the weight values obtained through training may be used to extract information from an input image, so that the convolutional neural network 200 performs correct prediction.

When the convolutional neural network 200 has a plurality of convolutional layers, an initial convolutional layer (for example, 221) usually extracts a large quantity of general features. The general features may also be referred to as low-level features. As the convolutional neural network 200 becomes deeper, features extracted at a more subsequent convolutional layer (for example, 226) become more complex, for example, high-level semantic features. Features at a higher semantic level are more applicable to a to-be-resolved problem.

Pooling Layer/Pooling Layer 220:

A quantity of training parameters often needs to be reduced. Therefore, the pooling layer often needs to be periodically introduced after the convolutional layer. For the layers 221 to 226 of 220 shown in FIG. 2, one convolutional layer may be followed by one pooling layer, or a plurality of convolutional layers may be followed by one or more pooling layers. In an image processing process, the pooling layer is only used to reduce a space size of an image. The pooling layer may include a mean pooling operator and/or a maximum pooling operator, to sample an input image to obtain an image with a smaller size. The mean pooling operator may perform calculation on pixel values on an image within a specified range to generate a mean value as a mean pooling result. The maximum pooling operator may take a pixel with a maximum value within a specified range as a maximum pooling result. In addition, as the size of the weight matrix at the convolutional layer needs to be related to the size of the image, the operator at the pooling layer also needs to be related to the size of the image. A size of an image that is output after processing is performed at the pooling layer may be less than a size of an image that is input to the pooling layer, and each pixel in the image that is output by the pooling layer represents a mean value or a maximum value of a corresponding sub-area of the image that is input to the pooling layer.

Neural Network Layer 230:

After processing is performed at the convolutional layer/pooling layer 220, the convolutional neural network 200 is not ready to output required output information. A reason is that as described above, the convolutional layer/pooling layer 220 only extracts features and reduces parameters brought by an input image. However, to generate the final output information (required category information or other related information), the convolutional neural network 200 needs to use the neural network layer 230 to generate a quantity output of one or a group of required categories. Therefore, the neural network layer 230 may include a plurality of hidden layers (for example, 231, 232, and 23n shown in FIG. 2) and an output layer 240. Parameters included at the plurality of hidden layers may be obtained through pre-training based on related training data of a specific task type. For example, the task type may include image recognition, image classification, and image super-resolution reconstruction.

The output layer 240 follows the plurality of hidden layers in the neural network layer 230, in other words, the output layer 240 is the last layer of the entire convolutional neural network 200. The output layer 240 has a loss function similar to a classification cross entropy, and the loss function is specifically used to calculate a prediction error. Once forward propagation (as shown in FIG. 2, propagation in a direction from 210 to 240 is forward propagation) in the entire convolutional neural network 200 is completed, back propagation (as shown in FIG. 2, propagation in a direction from 240 to 210 is back propagation) is started to update a weight value and a deviation at each layer mentioned above, to reduce a loss of the convolutional neural network 200 and an error between an ideal result and a result that is output by the convolutional neural network 200 by using the output layer.

It should be noted that the convolutional neural network 200 shown in FIG. 2 is only an example of a convolutional neural network. In specific application, the convolutional neural network may alternatively exist in a form of another network model.

In this application, a to-be-processed image may be processed by using the convolutional neural network 200 shown in FIG. 2, to obtain a classification result of the to-be-processed image. As shown in FIG. 2, after the to-be-processed image is processed at the input layer 210, the convolutional layer/the pool layer 220, and the neural network layer 230, the classification result of the to-be-processed image is output.

Figure 3:
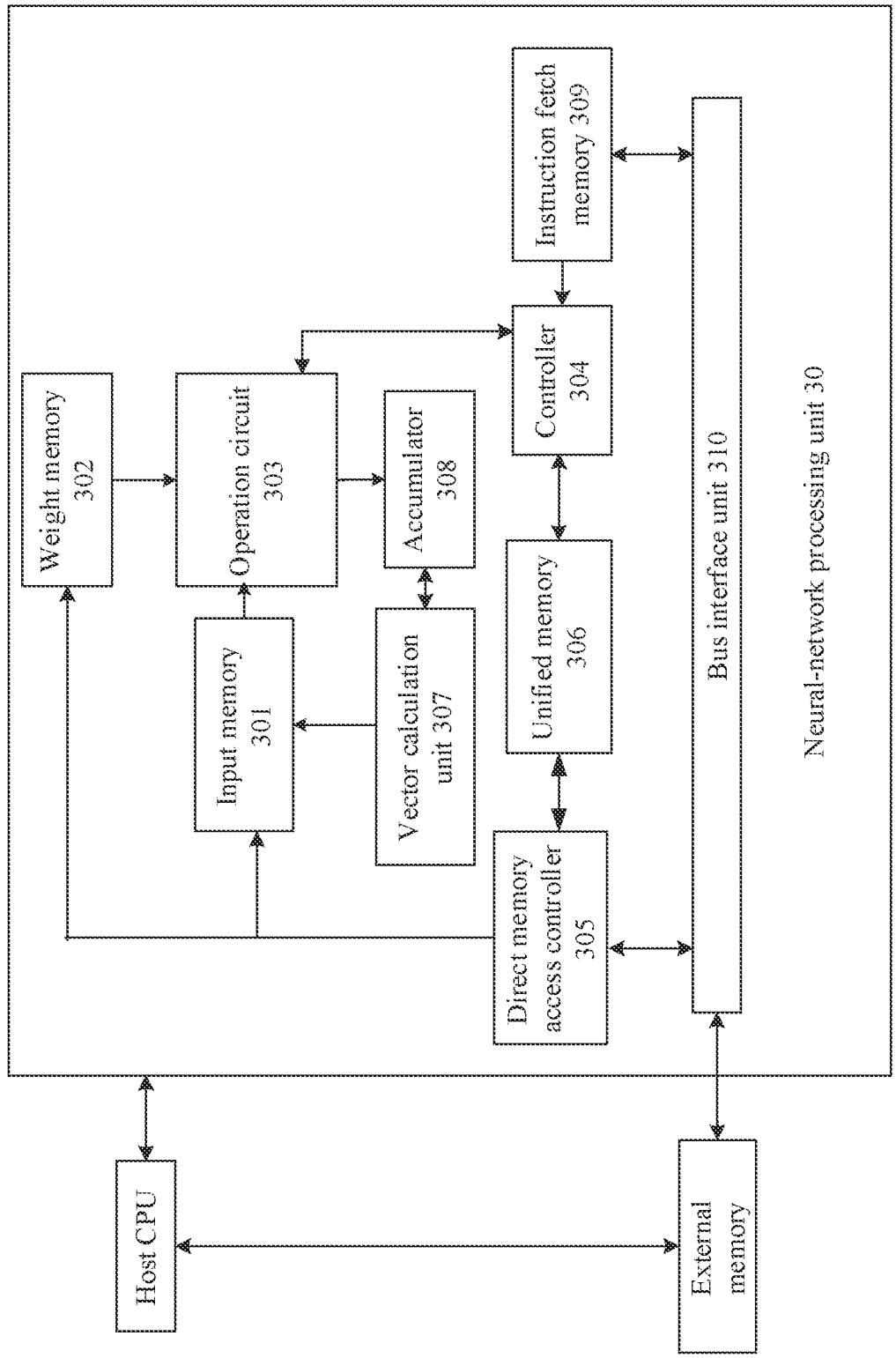
FIG. 3 is a schematic diagram of a hardware structure of a chip according to an embodiment of this application.

FIG. 3 shows a hardware structure of a chip according to an embodiment of this application. The chip includes a neural-network processing unit 30. The chip may be disposed in the execution device 110 shown in FIG. 1, to complete calculation of the calculation module 111. The chip may be alternatively disposed in the training device 120 shown in FIG. 1, to complete training of the training device 120 and output the target model/rule 101. Algorithms of the layers in the convolutional neural network shown in FIG. 2 may be implemented in the chip shown in FIG. 3.

The neural-network processing unit NPU 30 is mounted to a host CPU as a coprocessor, and a task is allocated by the host CPU. A core part of the NPU is an operation circuit 303, and a controller 304 controls the operation circuit 303 to extract data from a memory (a weight memory or an input memory) and perform an operation.

In some implementations, the operation circuit 303 includes a plurality of processing elements (process engine, PE). In some implementations, the operation circuit 303 is a two-dimensional systolic array. Alternatively, the operation circuit 303 may be a one-dimensional systolic array or another electronic circuit that can perform a mathematical operation such as multiplication and addition. In some implementations, the operation circuit 303 is a general-purpose matrix processor.

For example, it is assumed that there is an input matrix A, a weight matrix B, and an output matrix C. The operation circuit 303 extracts data corresponding to the matrix B from a weight memory 302, and buffers the data on each PE in the operation circuit 303. The operation circuit 303 extracts data of the matrix A from an input memory 301, performs a matrix operation on the data of the matrix A and the matrix B, and stores an obtained partial result or final result of a matrix into an accumulator 308.

A vector calculation unit 307 may perform further processing such as vector multiplication, vector addition, an exponent operation, a logarithm operation, or value comparison on an output of the operation circuit 303. For example, the vector calculation unit 307 may be configured to perform network calculation such as pooling, batch normalization, or local response normalization at a non-convolutional/non-FC layer in the neural network.

In some implementations, the vector calculation unit 307 can store, into a unified buffer 306, an output vector that has been processed. For example, the vector calculation unit 307 may apply a nonlinear function to the output of the operation circuit 303, for example, a vector of accumulated values, to generate an activation value. In some implementations, the vector calculation unit 307 generates a normalized value, a combined value, or both of the two values. In some implementations, the output vector that has been processed can be used as an activation input of the operation circuit 303, for example, to be used at a subsequent layer in the neural network.

The unified memory 306 is configured to store input data and output data.

For weight data, a direct memory access controller (direct memory access controller, DMAC) 305 is directly configured to transfer input data in an external memory into the input memory 301 and/or the unified memory 306, store weight data in the external memory into the weight memory 302, and store the data in the unified memory 306 into the external memory.

A bus interface unit (BIU) 310 is configured to implement interaction between the host CPU, the DMAC, and an instruction fetch memory 309 by using a bus.

The instruction fetch memory (instruction fetch buffer) 309 connected to the controller 304 is configured to store instructions for use by the controller 304.

The controller 304 is configured to invoke the instructions buffered in the instruction fetch memory 309, to implement a working process of controlling an operation accelerator.

Generally, the unified memory 306, the input memory 301, the weight memory 302, and the instruction fetch memory 309 each are an on-chip (On-Chip) memory. The external memory is a memory outside the NPU. The external memory may be a double data rate synchronous dynamic random access memory (double data rate synchronous dynamic random access memory, DDR SDRAM for short), a high bandwidth memory (high bandwidth memory, HBM), or another readable and writable memory.

The operation at each layer of the convolutional neural network shown in FIG. 2 may be performed by the operation circuit 303 or the vector calculation unit 307.

The execution device 110 in FIG. 1 described above can perform steps of the image classification method in the embodiments of this application. The CNN model shown in FIG. 2 and the chip shown in FIG. 3 may also be used to perform the steps of the image classification method in the embodiments of this application. The following describes in detail the image classification method in the embodiments of this application with reference to the accompanying drawings.

Figure 4:
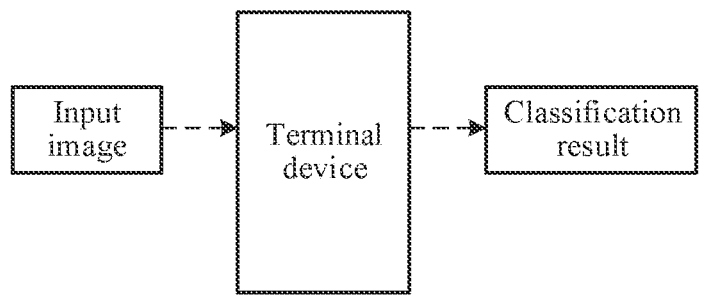
FIG. 4 is a schematic diagram of an application scenario according to an embodiment of this application.

The image classification method provided in the embodiments of this application may be performed on a server, may be performed on a cloud, or may be performed on a terminal device. The terminal device is used as an example. As shown in FIG. 4, the technical solutions of the embodiments of this application may be applied to the terminal device. In the image classification method in the embodiments of this application, image classification may be performed on an input image to obtain a classification result of the input image. The terminal device may be mobile or fixed. For example, the terminal device may be a device with an image processing function, for example, a mobile phone, a tablet personal computer (tablet personal computer, TPC), a media player, a smart TV, a laptop computer (laptop computer, LC), a personal digital assistant (personal digital assistant, PDA), a personal computer (personal computer, PC), a camera, a video camera, a smart watch, a wearable device (wearable device, WD), or a self-driving vehicle. This is not limited in the embodiments of this application.

Image (or picture) classification is a basis for various image processing applications. Computer vision often relates to how to classify an obtained image. However, both a parameter quantity and a calculation amount of a high-precision convolutional neural network are large, and a terminal device has very limited memory and very limited computing resources and does not have a strong calculation capability and buffering capability. Consequently, it is difficult to deploy the high-precision convolutional neural network on the terminal device.

Convolution processing in a conventional convolutional neural network includes addition and multiplication. In the embodiments of this application, an image classification method is proposed, to replace the multiplication operation in the conventional convolutional neural network with an addition operation or a subtraction operation. Calculation overheads of the addition operation or the subtraction operation on a computer are less than calculation overheads of the multiplication operation. Therefore, this reduces calculation overheads of a convolutional neural network model used for image classification.

Figure 5:
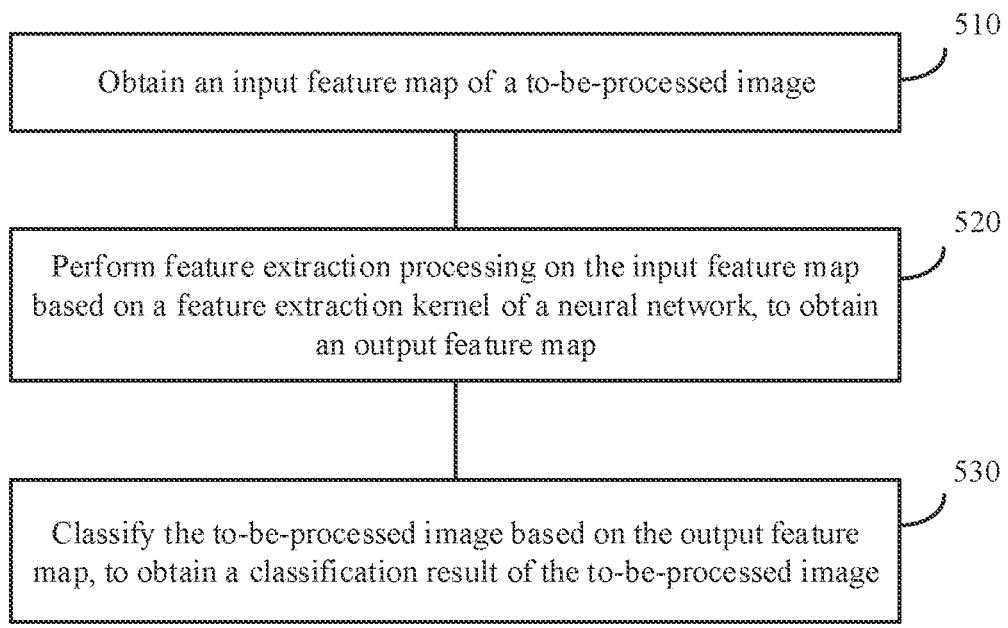
FIG. 5 is a schematic flowchart of an image classification method according to an embodiment of this application.

FIG. 5 is a schematic flowchart of an image classification method 500 according to an embodiment of this application. The method may be performed by an image classification apparatus. For example, the method may be performed by the terminal device in FIG. 4.

S510. Obtain an input feature map of a to-be-processed image.

The input feature map may include the plurality of input sub-feature maps.

When the method shown in FIG. 5 is performed by the terminal device in FIG. 4, the to-be-processed image may be an image obtained by the terminal device through photographing by using a camera, or the to-be-processed image may be an image obtained from the inside of the terminal device (for example, an image stored in an album on the terminal device or an image obtained by the terminal device from a cloud).

Alternatively, the input feature map of the to-be-processed image may be a feature map obtained after processing is performed at another layer in a convolutional neural network. It should be understood that the another layer in the convolutional neural network herein is a layer in the convolutional neural network. For example, the another layer may be one of an input layer, a convolutional layer, a pooling layer, or a full connected layer in the convolutional neural network.

S520. Perform feature extraction processing on the input feature map based on a feature extraction kernel of a neural network, to obtain an output feature map.

The output feature map may include the plurality of output sub-feature maps. Each of the plurality of output sub-feature maps may be determined based on the corresponding input sub-feature map and the feature extraction kernel. At least one of the output sub-feature maps is determined based on a target matrix obtained after an absolute value is taken. A difference between the target matrix and the input sub-feature map corresponding to the target matrix is the feature extraction kernel.

It should be noted that the neural network may include a plurality of feature extraction kernels, and the plurality of feature extraction kernels may be used to perform a plurality of times of feature extraction processing on the input feature map, to obtain a plurality of output feature maps. In other words, each feature extraction kernel in the plurality of feature extraction kernels may be used to perform one time of feature extraction processing on the input feature map. Correspondingly, one output feature map may be obtained.

The feature extraction kernel in S520 may be one of the plurality of feature extraction kernels included in the neural network. Correspondingly, the feature extraction processing in S520 may be one of the plurality of times of feature extraction.

For example, it is assumed that the neural network includes ten feature extraction kernels. In this case, when the to-be-processed image is classified, the ten feature extraction kernels may be used to separately perform ten times of feature extraction processing on the input feature map of the to-be-processed image. Correspondingly, ten output feature maps may be obtained.

Further, the feature extraction processing includes a plurality of feature extraction operations, and the feature extraction operation means determining an output sub-feature map based on an input sub-feature map and the feature extraction kernel.

Optionally, S520 may be one time of feature extraction processing in the ten times of feature extraction processing, and the feature extraction processing may include a plurality of feature extraction operations. The following describes in detail the feature extraction operation with reference to FIG. 6.

Figure 6:
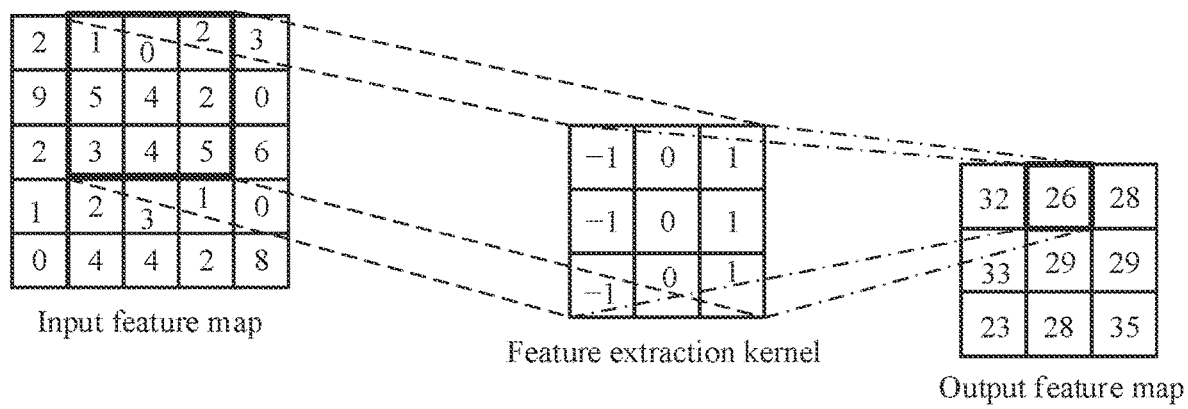
FIG. 6 is a schematic diagram of a feature extraction operation according to an embodiment of this application.

For example, FIG. 6 shows one feature extraction operation in the feature extraction processing in S520.

Specifically, a feature extraction operation is performed on matrices formed by elements at corresponding locations in the feature extraction kernel and a sliding window (the sliding window herein is a black bold square box in the input feature map, and a start location of the sliding window may be a location in an upper left corner of the input feature map) in the input feature map.

In this application, a matrix formed by corresponding elements in the sliding window in the input feature map may also be referred to as an input sub-feature map. As the sliding window slides in a width or height direction of the input feature map, a plurality of input sub-feature maps may be obtained. Therefore, it may be understood that the input feature map includes a plurality of input sub-feature maps.

Optionally, the feature extraction operation in this embodiment of this application may include two manners that are specifically as follows:

Manner 1:

The feature extraction operation may be convolution in a conventional neural network.

The elements at the corresponding locations in the feature extraction kernel and the input sub-feature map that are shown in FIG. 6 are multiplied and then summed up to obtain 0.

In this case, the feature extraction kernel may also be referred to as a convolution kernel, and the feature extraction operation may also be referred to as convolution. In other words, a result of performing convolution between the convolution kernel and the input sub-feature map is 0.

Manner 2:

The feature extraction operation may be subtraction matching (or addition matching) in this embodiment of this application.

Subtraction matching means performing subtraction on the elements at the corresponding locations in the feature extraction kernel and the input sub-feature map to obtain a target matrix, where absolute values of all elements in the target matrix are taken and then summed up.

Optionally, if the target matrix is obtained by adding the elements at the corresponding locations in the feature extraction kernel and the input sub-feature map, the feature extraction operation may also be referred to as addition matching. In this case, the absolute values of the all elements in the target matrix are taken and then summed up, to obtain a result of the feature extraction operation.

In other words, in this embodiment of this application, the target matrix is obtained by performing matrix addition or matrix subtraction on an input sub-feature map corresponding to the target matrix and the feature extraction kernel.

It should be understood that subtraction matching and addition matching in Manner 2 are only examples and constitute no limitation. Subtraction matching and addition matching may alternatively have other names. This is not limited in this embodiment of this application.

A result of subtraction matching shown in FIG. 6 is 26, and the result (26) may also be referred to as an output sub-feature map. It may be learned that each feature extraction operation may correspond to one output sub-feature map. Therefore, the output feature map may include a plurality of output sub-feature maps.

After the feature extraction operation shown in FIG. 6 is performed, the sliding window in the input feature map may slide in the width direction or the height direction of the input feature map, to continue to perform a next convolution operation, where a distance of each time of sliding is 1 (that is, sliding strides in both the width direction and the height direction are 1), until one time of feature extraction processing on the input image is completed to obtain a 3×3×1 output feature map shown in FIG. 6.

It should be further understood that the foregoing is described by using an example in which the sliding stride of the feature extraction operation is equal to 1. However, this is not limited in this embodiment of this application. The sliding stride of the feature extraction operation may be 2 or may be greater than 2.

It should be noted that the output feature map shown in FIG. 6 is only an example and constitutes no limitation. All output sub-feature maps in the output feature map shown in FIG. 6 are obtained by performing subtraction matching with the feature extraction kernel. One or more output sub-feature maps in the output feature map may be alternatively obtained by performing convolution with the feature extraction kernel. This is not limited in this embodiment of this application.

For example, if the feature extraction operation shown in FIG. 6 is convolution, an output sub-feature map corresponding to the feature extraction operation is 0. In this case, 26 in FIG. 6 should become the convolution result 0.

In this embodiment of this application, at least one of the output sub-feature maps is determined based on the target matrix existing after the absolute value is taken, the target matrix is determined based on the at least one input sub-feature map and the feature extraction kernel, and the difference between the target matrix and the at least one input sub-feature map is the feature extraction kernel.

In other words, the target matrix is obtained by performing matrix addition (the addition matching) or matrix subtraction (the subtraction matching) on the at least one input sub-feature map corresponding to the target matrix and the feature extraction kernel, and calculation overheads of an addition operation or a subtraction operation on a computer are less than calculation overheads of a multiplication operation. Therefore, in the method in this embodiment of this application, this reduces calculation overheads of a convolutional neural network model used for image classification.

For example, it is assumed that the neural network includes ten feature extraction kernels. In this case, when the to-be-processed image is classified, the ten feature extraction kernels are used to separately perform ten times of feature extraction processing on the input feature map of the to-be-processed image. If the input feature map of the to-be-processed image is shown in FIG. 6, when the sliding stride of the feature extraction operation is 1 and one time of feature extraction processing includes nine feature extraction operations, 90 feature extraction operations (ten times of feature extraction processing×nine feature extraction operations) need to be performed to classify the to-be-processed image.

In this embodiment of this application, at least one feature extraction operation in the 90 feature extraction operations is subtraction matching or addition matching in Manner 2, and an obtained output sub-feature map is the at least one output sub-feature map mentioned above.

Figure 7:
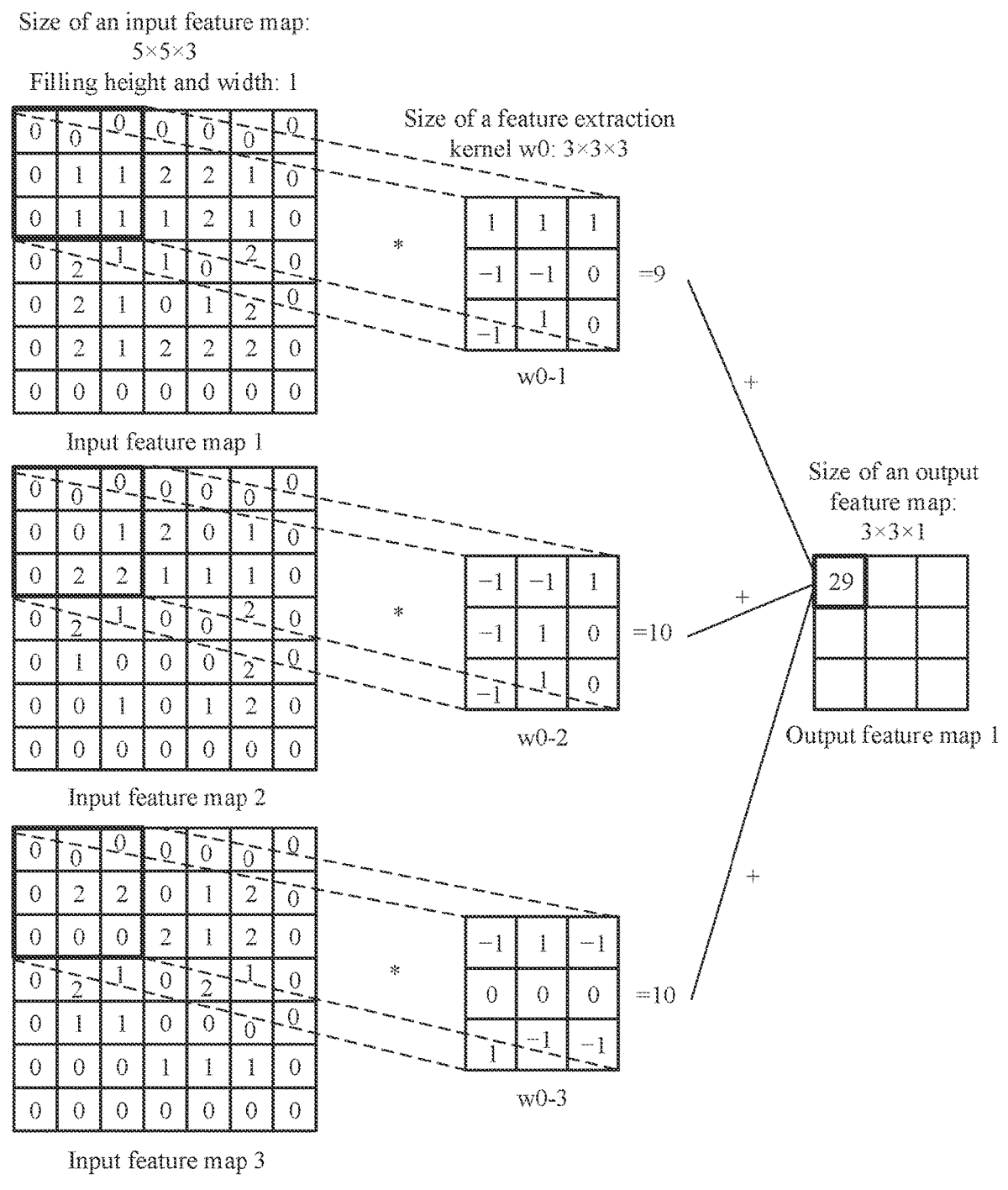

FIG. 7 shows a feature extraction operation in another embodiment of this application. A size of an input feature map of a to-be-processed image in FIG. 7 is 5×5×3. One pixel is filled at each of a height boundary and a width boundary of the input feature map of the to-be-processed image, to obtain a 7×7×3 input feature map.

In FIG. 7, a size of a feature extraction kernel w0 is 3×3×3. Feature extraction is respectively performed on three input feature maps (an input feature map 1, an input feature map 2, and an input feature map 3) of the to-be-processed image and three layers of depths (a convolution kernel w0-1, a convolution kernel w0-2, and a convolution kernel w0-3) of the feature extraction kernel, to obtain an output feature map 1. A size of the output feature map 1 is 3×3×1.

Specifically, a feature extraction operation is performed on matrices formed by elements at corresponding locations in the first layer of depth (namely, w0-1) of w0 and a sliding window (the sliding window herein is a black bold square box in the input feature map 1, and a start location of the sliding window may be a location in an upper left corner of the input feature map) in the input feature map 1.

Optionally, the feature extraction operation in FIG. 7 may be Manner 1, or the feature extraction operation in FIG. 7 may be Manner 2.

Specifically, when the feature extraction operation in FIG. 7 is Manner 1, refer to the descriptions in Manner 1 and a conventional technology. Details are not described herein again.

The following uses subtraction matching as an example to describe a case in which the feature extraction operation in FIG. 7 is Manner 2.

As shown in FIG. 7, a target matrix w0-1 is obtained by performing subtraction on the matrices formed by the elements at the corresponding locations in the feature extraction kernel w0-1 and the sliding window in the input feature map 1. Absolute values of all elements in the target matrix w0-1 are taken and then summed up to obtain 9. Similarly, a feature extraction operation is respectively performed on the other two depths (namely, w0-2 and w0-3) of the feature extraction kernel w0 and both the input feature map 2 and the input feature map 3, to obtain a target matrix w0-2 and a target matrix w0-3, so as to obtain 10 and 10. In this case, the first element in the output feature map 1 in FIG. 1 is 9+10+10=29. After the first feature extraction operation is performed on the feature extraction kernel w0, the sliding windows successively slide in width directions or height directions of all the input feature maps, to continue to perform a next feature extraction operation, where a distance of each time of sliding is 2 (that is, sliding strides in both the width direction and the height direction are 2), until the feature extraction operation on the input image is completed to obtain the 3×3×1 output feature map 1.

Similarly, if the feature extraction operation is further performed on the input image by using another feature extraction kernel w1, an output feature map 2 may be obtained based on a process similar to that of the feature extraction kernel w0, and a size of the output feature map 2 is 3×3×2.

Optionally, the output feature map 1 and the output feature map 2 may be further activated by using an activation function, to obtain the activated output feature map 1 and the activated output feature map 2.

Optionally, a matrix formed by corresponding elements in the sliding window in the input feature map (including the input feature map 1, the input feature map 2, and the input feature map 3) may also be referred to as an input sub-feature map. An input sub-feature map on which the feature extraction operation is performed and that is shown in FIG. 7 is a matrix formed by corresponding elements in the sliding windows in the input feature map 1, the input feature map 2, and the input feature map 3, that is, a size of the input sub-feature map is 3×3×3.

Similarly, a target matrix in FIG. 7 is a matrix formed by the target matrix w0-1, the target matrix w0-2, and the target matrix w0-3, that is, a size of the target matrix is 3×3×3.

It should be further understood that the foregoing is described by using an example in which the sliding stride of the feature extraction operation is equal to 1. However, this is not limited in this embodiment of this application. The sliding stride of the feature extraction operation may be 2 or may be greater than 2.

It should be noted that the output feature map shown in FIG. 7 is only an example and constitutes no limitation. An output sub-feature map shown in FIG. 7 is obtained by performing subtraction matching with the feature extraction kernel. Another output sub-feature map of the output feature map may be obtained in Manner 1 or Manner 2. This is not limited in this embodiment of this application.

In this application, the at least one output sub-feature map Y(m,n,t) may be obtained by performing matrix addition on the at least one input sub-feature map and the feature extraction kernel, and the matrix addition is specifically the following formula:

$$Y(m, n, t) = \sum_{i=0}^{d-1}\sum_{j=0}^{d-1}\sum_{k=1}^{c} |X(m+i, n+j, k) + F(i, j, k, t)|; \text{ or} \quad (1)$$

$$Y(m, n, t) = \sum_{i=0}^{d-1}\sum_{j=0}^{d-1}\sum_{k=1}^{c} -|X(m+i, n+j, k) + F(i, j, k, t)| \quad (2)$$

Alternatively, the at least one output sub-feature map Y(m,n,t) may be obtained by performing matrix subtraction on the at least one input sub-feature map and the feature extraction kernel, and the matrix subtraction is specifically the following formula:

$$Y(m, n, t) = \sum_{i=0}^{d-1}\sum_{j=0}^{d-1}\sum_{k=1}^{C} |X(m+i, n+j, k) - F(i, j, k, t)|; \text{ or} \quad (3)$$

$$Y(m, n, t) = \sum_{i=0}^{d-1}\sum_{j=0}^{d-1}\sum_{k=1}^{C} -|X(m+i, n+j, k) - F(i, j, k, t)|, \quad (4)$$

where

|(•)| is an operation for taking an absolute value, Σ(•) is a summation operation, Y(m,n,t) is the at least one of the output sub-feature maps, Y(m,n,t) is an element in an $m^{th}$ row and an $n^{th}$ column on a $t^{th}$ page in the output feature map, X(m+i,n+j,k) is an element in an $i^{th}$ row and a $j^{th}$ column on a $k^{th}$ page in the at least one of the input sub-feature maps, F(i,j,k,t) is an element in an $i^{th}$ row and a $j^{th}$ column on a $k^{th}$ page in the feature extraction kernel, t is a channel quantity of the feature extraction kernel, d is a row quantity of the feature extraction kernel, C is a channel quantity of the input feature map, and d, C, i, j, k, m, n, and t are all integers.

S530. Classify the to-be-processed image based on the output feature map, to obtain a classification result of the to-be-processed image.

In this application, a parameter in the neural network may be further updated according to a back propagation algorithm. For example, the feature extraction kernel may be updated by using a gradient descent method.

Optionally, if the feature extraction operation is addition matching or subtraction matching in Manner 2, a gradient of the feature extraction kernel used in the feature extraction operation may be determined based on the target matrix, and a gradient of the input sub-feature map in the feature extraction operation may be determined based on the target matrix.

Optionally, when a value of T(m,n,i,j,k,t) falls within a preset value range, a gradient of F(i,j,k,t) is determined based on the value of T(m,n,j,k,t), and a gradient of X(m+i,n+j,k) is determined based on the value of T(m,n,i,j,k,t), where T(m,n,i,j,k,t)=X(m+i,n+j,k)±F(i,j,k,t), F(i,j,k,t) is the element in the $i^{th}$ row and the $j^{th}$ column on the $k^{th}$ page in the feature extraction kernel, X(m+i,n+j,k) is the element in the $i^{th}$ row and the $j^{th}$ column on the $k^{th}$ page in the at least one of the input sub-feature maps, and i, j, k, m, n, and t are all integers.

It should be noted that "±" in T(m,n,i,j,k,t)=X(m+i,n+j,k)±F(i,j,k,t) means that T(m,n,i,j,k,t)=X(m+i,n+j,k)+F(i,j,k,t) or T(m,n,i,j,k,t)=X(m+i,n+j,k)+F(i,j,k,t).

Another "±" in this application is similar to the foregoing description, and details are not described again.

In this application, depending on whether the feature extraction operation is addition matching or subtraction matching in Manner 2, calculation of the gradient of the feature of the feature extraction kernel may have the following two cases.

Case 1:

The feature extraction operation is addition matching in Manner 2.

For example, when the at least one output sub-feature map Y(m,n,t) is calculated according to the foregoing formula (1), the gradient of F(i,j,k,t) is obtained according to the following formula:

$$\frac{\partial Y(m, n, t)}{\partial F(i, j, k, t)} = \text{Hard tanh}(X(m+i, n+j, k) + F(i, j, k, t));$$

and the gradient of X(m+i,n+j,k) is obtained according to the following formula:

$$\frac{\partial Y(m, n, t)}{\partial X(m+i, n+j, k)} = \text{Hard tanh}(F(i, j, k, t) + X(m+i, n+j, k))$$

For another example, when the at least one output sub-feature map Y(m,n,t) is calculated according to the foregoing formula (2), the gradient of F(i,j,k,t) is obtained according to the following formula:

$$\frac{\partial Y(m, n, t)}{\partial F(i, j, k, t)} = -\text{Hard tanh}(X(m+i, n+j, k) + F(i, j, k, t));$$

and the gradient of X(m+i,n+j,k) is obtained according to the following formula:

$$\frac{\partial Y(m, n, t)}{\partial X(m+i, n+j, k)} = -\text{Hard tanh}(F(i, j, k, t) + X(m+i, n+j, k)), \text{ where}$$

$$\text{Hard tanh}(x) = \begin{cases} 1 & x > 1 \\ -1 & x < -1 \\ x & -1 \leq x \leq 1 \end{cases},$$

$\frac{\partial Y(m, n, t)}{\partial F(i, j, k, t)}$ is the gradient of $F(i, j, k, t)$, and $\frac{\partial Y(m, n, t)}{\partial X(m+i, n+j, k)}$ is the gradient of $X(m+i, n+j, k)$.

Case 2:

The feature extraction operation is subtraction matching in Manner 2.

For example, when the at least one output sub-feature map Y(m,n,t) is calculated according to the foregoing formula (3), the gradient of F(i,j,k,t) is obtained according to the following formula:

$$\frac{\partial Y(m, n, t)}{\partial F(i, j, k, t)} = \text{Hard tanh}(X(m+i, n+j, k) - F(i, j, k, t));$$

and the gradient of X(m+i,n+j,k) is obtained according to the following formula:

$$\frac{\partial Y(m, n, t)}{\partial X(m+i, n+j, k)} = \text{Hard tanh}(F(i, j, k, t) - X(m+i, n+j, k))$$

For another example, when the at least one output sub-feature map Y(m,n,t) is calculated according to the foregoing formula (4), the gradient of F(i,j,k,t) is obtained according to the following formula:

$$\frac{\partial Y(m, n, t)}{\partial F(i, j, k, t)} = -\text{Hard tanh}(X(m+i, n+j, k) - F(i, j, k, t));$$

and the gradient of X(m+i,n+j,k) is obtained according to the following formula:

$$\frac{\partial Y(m, n, t)}{\partial F(i, j, k, t)} = -\text{Hard tanh}(X(m+i, n+j, k) - F(i, j, k, t)), \text{ where}$$

$$\text{Hard tanh}(x) = \begin{cases} 1 & x > 1 \\ -1 & x < -1 \\ x & -1 \leq x \leq 1 \end{cases},$$

$\frac{\partial Y(m, n, t)}{\partial F(i, j, k, t)}$ is the gradient of $F(i, j, k, t)$, and $\frac{\partial Y(m, n, t)}{\partial X(m+i, n+j, k)}$ is the gradient of $X(m+i, n+j, k)$.

In this application, the gradient of F(i,j,k,t) and the gradient of X(m+i,n+j,k) are determined based on the value of T(m,n,i,j,k,t), so that possible value ranges of the gradient of F(i,j,k,t) and the gradient of X(m+i,n+j,k) can be expanded. Therefore, a value of the gradient of F(i,j,k,t) and a value of the gradient of X(m+i,n+j,k) are more diverse. This facilitates parameter optimization of the neural network model, and improves accuracy of image classification performed by a convolutional neural network module.

Figure 8:
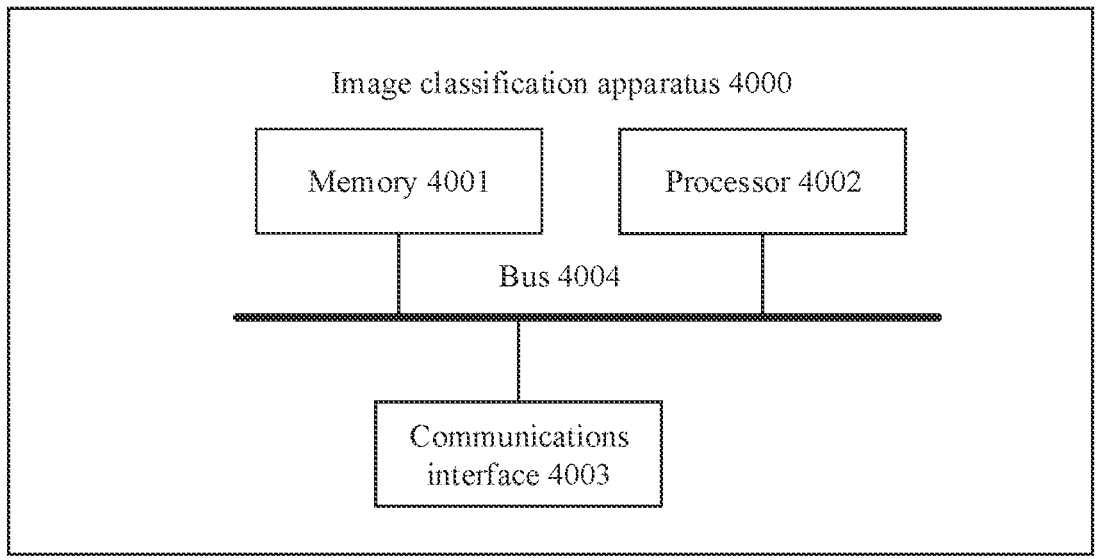
FIG. 8 is a schematic diagram of a hardware structure of an image classification apparatus according to an embodiment of this application.

FIG. 8 is a schematic diagram of a hardware structure of an image classification apparatus according to an embodiment of this application. An image classification apparatus 4000 shown in FIG. 8 includes a memory 4001, a processor 4002, a communications interface 4003, and a bus 4004. The memory 4001, the processor 4002, and the communications interface 4003 are communicatively connected to each other by using the bus 4004.

The memory 4001 may be a read-only memory (read-only memory, ROM), a static storage device, a dynamic storage device, or a random access memory (random access memory, RAM). The memory 4001 may store a program. When the program stored in the memory 4001 is executed by the processor 4002, the processor 4002 and the communications interface 4003 are configured to perform steps of the image classification method in the embodiments of this application.

The processor 4002 may be a general-purpose central processing unit (central processing unit, CPU), a microprocessor, an application-specific integrated circuit (application specific integrated circuit, ASIC), a graphics processing unit (graphics processing unit, GPU), or one or more integrated circuits, and is configured to execute a related program, to implement functions that need to be performed by the units in the image classification apparatus in this embodiment of this application, or perform the image classification method in the embodiments of this application.

The processor 4002 may be an integrated circuit chip and has a signal processing capability. In an implementation process, the steps of the image classification method in the embodiments of this application may be completed by using a hardware integrated logic circuit in the processor 4002 or by using instructions in a software form.

The foregoing processor 4002 may be a general purpose processor, a digital signal processor (digital signal processing, DSP), an ASIC, a field-programmable gate array (field-programmable gate array, FPGA) or another programmable logic device, a discrete gate or transistor logic device, or a discrete hardware component. The foregoing general purpose processor may be a microprocessor or the processor may also be any conventional processor, decoder, and the like. Steps of the methods disclosed with reference to the embodiments of this application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor 4002, the functions that need to be performed by the units included in the image classification apparatus in this embodiment of this application, or performs the image classification method in the method embodiment of this application.

The communications interface 4003 uses a transceiver apparatus including but not limited to a transceiver, to implement communication between the apparatus 4000 and another device or a communications network. For example, a to-be-processed image may be obtained through the communications interface 4003.

The bus 4004 may include a channel through which information is transmitted between the parts (for example, the memory 4001, the processor 4002, and the communications interface 4003) of the apparatus 4000.

Figure 9:
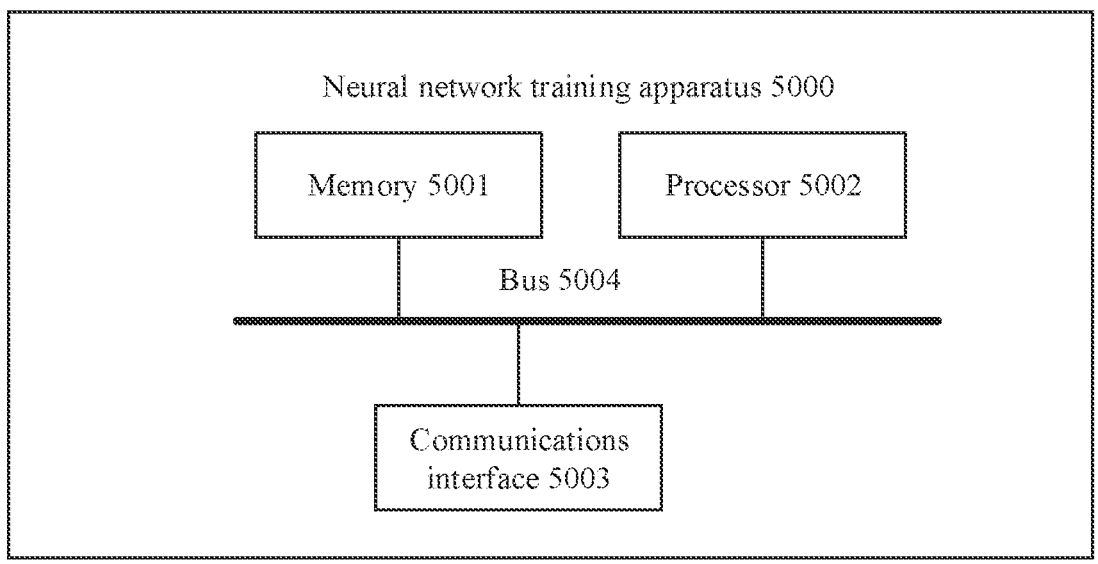
FIG. 9 is a schematic diagram of a hardware structure of a neural network training apparatus according to an embodiment of this application.

FIG. 9 is a schematic diagram of a hardware structure of a neural network training apparatus 5000 according to an embodiment of this application. Similar to the foregoing apparatus 4000, the neural network training apparatus 5000 shown in FIG. 9 includes a memory 5001, a processor 5002, a communications interface 5003, and a bus 5004. The memory 5001, the processor 5002, and the communications interface 5003 are communicatively connected to each other by using the bus 5004.

The memory 5001 may store a program. When the program stored in the memory 5001 is executed by the processor 5002, the processor 5002 is configured to perform steps of a neural network training method in the embodiments of this application.

The processor 5002 may be a general-purpose CPU, a microprocessor, an ASIC, a GPU, or one or more integrated circuits, and is configured to perform a related operation, to implement the method for training an image classification model provided in the embodiments of this application.

The processor 5002 may be an integrated circuit chip and has a signal processing capability. In an implementation process, the steps of the method for training an image classification model in the embodiments of this application may be completed by using a hardware integrated logic circuit in the processor 5002 or by using instructions in a software form.

It should be understood that, the image classification model is trained by using the neural network training apparatus 5000 shown in FIG. 9, so that the image classification model obtained through training can be used to perform the image classification method in the embodiments of this application. Specifically, a neural network model in the method shown in FIG. 5 can be obtained by training a neural network by using the apparatus 5000.

Specifically, the apparatus shown in FIG. 9 may obtain training data and a to-be-trained image classification model from the outside through the communications interface 5003. Then, the processor trains the to-be-trained image classification model based on the training data.

It should be noted that only the memory, the processor, and the communications interface of each of the apparatus 4000 and the apparatus 5000 are illustrated. However, in a specific implementation process, a person skilled in the art should understand that the apparatus 4000 and the apparatus 5000 may further include other components required for implementing normal running. In addition, according to a specific requirement, a person skilled in the art should understand that the apparatus 4000 and apparatus 5000 may further include hardware components for implementing other additional functions. In addition, a person skilled in the art should understand that the apparatus 4000 and the apparatus 5000 may include only components required for implementing the embodiments of this application, and do not necessarily include all the components shown in FIG. 8 and FIG. 9.

It should be understood that, the processor in the embodiments of this application may be a central processing unit (central processing unit, CPU), or may further be another general purpose processor, a digital signal processor (digital signal processor, DSP), an application specific integrated circuit (application specific integrated circuit, ASIC), a field programmable gate array (field programmable gate array, FPGA), or another programmable logic device, discrete gate or transistor logic device, discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memory (random access memory, RAM) RAMs may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification is merely an association relationship for describing associated objects, and indicates that three relationships may exist. For example, A and/or B may represent three cases: only A exists, both A and B exist, and only B exists, where A, B can be singular or plural. In addition, the character "/" in this specification generally represents an "or" relationship between associated objects, but may alternatively represent an "and/or" relationship. For detailed understanding, refer to the context.

In this application, "at least one" means one or more, and "a plurality of" means two or more. "At least one of the following items" or a similar expression means any combination of these items, including any combination of a single item or a plurality of items. For example, at least one of a, b, or c may represent a, b, c, a-b, a-c, b-c, or a-b-c, where a, b, and c may be in a single form or a plural form.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An image classification method, comprising:
obtaining an input feature map of a to-be-processed image, wherein the input feature map comprises a plurality of input sub-feature maps;
performing feature extraction processing on the input feature map based on a feature extraction kernel of a neural network to obtain an output feature map, wherein the output feature map comprises a plurality of output sub-feature maps, wherein each of the plurality of output sub-feature maps is determined based on the corresponding input sub-feature map and the feature extraction kernel, wherein at least one of the output sub-feature maps is determined based on a target matrix obtained after an absolute value is taken, and wherein a difference between the target matrix and the input sub-feature map corresponding to the target matrix is the feature extraction kernel; and
classifying the to-be-processed image based on the output feature map to obtain a classification result of the to-be-processed image.

2. The method according to claim 1, wherein the target matrix is obtained by performing matrix addition or matrix subtraction on at least one of the input sub-feature maps and the feature extraction kernel.

3. The method according to claim 2, wherein the at least one of the output sub-feature maps is obtained according to the following formula:

$$\frac{\partial Y(m, n, t)}{\partial F(i, j, k, t)} = -\text{Hard tanh}(F(i, j, k, t) \pm X(m+i, n+j, k));$$

wherein

|(•)| is an operation for taking an absolute value, Σ(•) is a summation operation, Y(m,n,t) is the at least one of the output sub-feature maps, Y(m,n,t) is an element in an $m^{th}$ row and an $n^{th}$ column on a $t^{th}$ page in the output feature map, X(m+i,n+j,k) is an element determined based on an $i^{th}$ row and a $j^{th}$ column on a $k^{th}$ page in the at least one of the input sub-feature maps, F(i,j,k,t) is an element in an $i^{th}$ row and a $j^{th}$ column on a $k^{th}$ page in the feature extraction kernel, t is a channel quantity of the feature extraction kernel, d is a row quantity of the feature extraction kernel, C is a channel quantity of the input feature map, and d, C, i, j, k, m, n, and t are all integers.

4. The method according to claim 1, wherein a gradient of the feature extraction kernel is determined based on the target matrix, and a gradient of the input sub-feature map is determined based on the target matrix.

5. The method according to claim 4, wherein when a value of T(m,n,i,j,k,t) falls within a preset value range, a gradient of F(i,j,k,t) is determined based on the value of T(m,n,i,j,k,t), and a gradient of X(m+i,n+j,k) is determined based on the value of T(m,n,i,j,k,t), wherein:
T(m,n,i,j,k,t)=X(m+i,n+j,k)±F(i,j,k,t), F(i,j,k,t) is an element in the $i^{th}$ row and the $j^{th}$ column on the $k^{th}$ page in the feature extraction kernel, X(m+i, n+j,k) is an element determined based on the $i^{th}$ row and the $j^{th}$ column on the $k^{th}$ page in the at least one of the input sub-feature maps, and i, j, k, m, n, and t are all integers.

6. The method according to claim 5, wherein the gradient of F(i,j,k,t) is obtained according to the following formula:

$$\frac{\partial Y(m, n, t)}{\partial F(i, j, k, t)} = -\text{Hard tanh}(F(i, j, k, t) \pm X(m+i, n+j, k));$$

and
the gradient of X(m+i,n+j, k) is obtained according to the following formula:

$$\frac{\partial Y(m,n,t)}{\partial X(m+i,n+j,k)} = -\text{Hard tanh}(X(m+i,n+j,k) \pm F(i,j,k,t)),$$

$$\text{wherein Hard tanh}(x) = \begin{cases} 1 & x > 1 \\ -1 & x < -1 \\ x & -1 \le x \le 1 \end{cases},$$

$\dfrac{\partial Y(m,n,t)}{\partial F(i,j,k,t)}$ is the gradient of $F(i,j,k,t)$, and $\dfrac{\partial Y(m,n,t)}{\partial X(m+i,n+j,k)}$ is the gradient of $X(m+i,n+j,k)$.

7. An image classification apparatus, comprising:
at least one processor;
one or more memories coupled to the at least one processor and storing programming instructions for execution by the at least one processor to:
  obtain an input feature map of a to-be-processed image, wherein the input feature map comprises a plurality of input sub-feature maps;
  perform feature extraction processing on the input feature map based on a feature extraction kernel of a neural network to obtain an output feature map, wherein the output feature map comprises a plurality of output sub-feature maps, each of the plurality of output sub-feature maps is determined based on the corresponding input sub-feature map and the feature extraction kernel, at least one of the output sub-feature maps is determined based on a target matrix obtained after an absolute value is taken, and a difference between the target matrix and the input sub-feature map corresponding to the target matrix is the feature extraction kernel; and
  classify the to-be-processed image based on the output feature map, to obtain a classification result of the to-be-processed image.

8. The apparatus according to claim 7, wherein the target matrix is obtained by performing matrix addition or matrix subtraction on at least one of the input sub-feature maps and the feature extraction kernel.

9. The apparatus according to claim 8, wherein the at least one of the output sub-feature maps is obtained according to the following formula:

$$Y(m,n,t) = \sum_{i=0}^{d-1}\sum_{j=0}^{d-1}\sum_{k=1}^{C} -|X(m+i,n+j,k) - F(i,j,k,t)|; \text{ or}$$

$$Y(m,n,t) = \sum_{i=0}^{d-1}\sum_{j=0}^{d-1}\sum_{k=1}^{C} -|X(m+i,n+j,k) + F(i,j,k,t)|,$$

wherein:
  $|(\cdot)|$ is an operation for taking an absolute value, $\Sigma(\cdot)$ is a summation operation, $Y(m,n,t)$ is the at least one of the output sub-feature maps, $Y(m,n,t)$ is an element in an $m^{th}$ row and an $n^{th}$ column on a $t^{th}$ page in the output feature map, $X(m+i,n+j,k)$ is an element determined based on an $i^{th}$ row and a $j^{th}$ column on a $k^{th}$ page in the at least one of the input sub-feature maps, $F(i,j,k,t)$ is an element in an $i^{th}$ row and a $j^{th}$ column on a $k^{th}$ page in the feature extraction kernel, t is a channel quantity of the feature extraction kernel, d is a row quantity of the feature extraction kernel, C is a channel quantity of the input feature map, and d, C, i, j, k, m, n, and t are all integers.

10. The apparatus according to claim 7, wherein a gradient of the feature extraction kernel is determined based on the target matrix, and a gradient of the input sub-feature map is determined based on the target matrix.

11. The apparatus according to claim 10, wherein when a value of T(m,n,i,j,k,t) falls within a preset value range, a gradient of F(i,j,k,t) is determined based on the value of T(m,n,i,j,k,t), and a gradient of X(m+i,n+j,k) is determined based on the value of T(m,n,i,j,k,t), wherein:
  T(m,n,i,j,k,t)=X(m+i,n+j,k)±F(i,j,k,t), F(i,j,k,t) is an element in the $i^{th}$ row and the $j^{th}$ column on the $k^{th}$ page in the feature extraction kernel, X(m+i, n+j,k) is an element determined based on the $i^{th}$ row and the $j^{th}$ column on the $k^{th}$ page in the at least one of the input sub-feature maps, and i, j, k, m, n, and t are all integers.

12. The apparatus according to claim 11, wherein the gradient of F(i,j,k,t) is obtained according to the following formula:

$$\frac{\partial Y(m,n,t)}{\partial F(i,j,k,t)} = -\text{Hard tanh}(F(i,j,k,t) \pm X(m+i,n+j,k));$$

and
  the gradient of X(m+i,n+j,k) is obtained according to the following formula:

$$\frac{\partial Y(m,n,t)}{\partial X(m+i,n+j,k)} = -\text{Hard tanh}(X(m+i,n+j,k) \pm F(i,j,k,t)),$$

$$\text{wherein Hard tanh}(x) = \begin{cases} 1 & x > 1 \\ -1 & x < -1 \\ x & -1 \le x \le 1 \end{cases},$$

$\dfrac{\partial Y(m,n,t)}{\partial F(i,j,k,t)}$ is the gradient of $F(i,j,k,t)$, and $\dfrac{\partial Y(m,n,t)}{\partial X(m+i,n+j,k)}$ is the gradient of $X(m+i,n+j,k)$.

13. A non-transitory computer-readable storage medium, wherein the computer-readable storage medium stores program code to be executed by a device, and the program code comprises instructions used to obtain an input feature map of a to-be-processed image, wherein the input feature map comprises a plurality of input sub-feature maps;
  perform feature extraction processing on the input feature map based on a feature extraction kernel of a neural network to obtain an output feature map, wherein the output feature map comprises a plurality of output sub-feature maps, wherein each of the plurality of output sub-feature maps is determined based on the corresponding input sub-feature map and the feature extraction kernel, wherein at least one of the output sub-feature maps is determined based on a target matrix obtained after an absolute value is taken, and wherein a difference between the target matrix and the input sub-feature map corresponding to the target matrix is the feature extraction kernel; and
  classify the to-be-processed image based on the output feature map to obtain a classification result of the to-be-processed image.

14. The non-transitory computer-readable storage medium of claim 13, wherein the target matrix is obtained by performing matrix addition or matrix subtraction on at least one of the input sub-feature maps and the feature extraction kernel.

15. The non-transitory computer-readable storage medium of claim 14, wherein the at least one of the output sub-feature maps is obtained according to the following formula:

$$Y(m, n, t) = \sum_{i=0}^{d-1}\sum_{j=0}^{d-1}\sum_{k=1}^{C} -|X(m+i, n+j, k) - F(i, j, k, t)|; \text{ or}$$

$$Y(m, n, t) = \sum_{i=0}^{d-1}\sum_{j=0}^{d-1}\sum_{k=1}^{C} -|X(m+i, n+j, k) + F(i, j, k, t)|,$$

wherein $|(\bullet)|$ is an operation for taking an absolute value, $\Sigma(\bullet)$ is a summation operation, Y(m,n,t) is the at least one of the output sub-feature maps, Y(m,n,t) is an element in an $m^{th}$ row and an $n^{th}$ column on a $t^{th}$ page in the output feature map, X(m+i,n+j,k) is an element determined based on an $i^{th}$ row and a $j^{th}$ column on a $k^{th}$ page in the at least one of the input sub-feature maps, F(i,j,k,t) is an element in an $i^{th}$ row and a $j^{th}$ column on a $k^{th}$ page in the feature extraction kernel, t is a channel quantity of the feature extraction kernel, d is a row quantity of the feature extraction kernel, C is a channel quantity of the input feature map, and d, C, i, j, k, m, n, and t are all integers.

16. The non-transitory computer-readable storage medium of claim 13, wherein a gradient of the feature extraction kernel is determined based on the target matrix, and a gradient of the input sub-feature map is determined based on the target matrix.

17. A chip, wherein the chip comprises at least one processor and a data interface, and the at least one processor reads instructions stored in a memory through the data interface, to:

obtain an input feature map of a to-be-processed image, wherein the input feature map comprises a plurality of input sub-feature maps;

perform feature extraction processing on the input feature map based on a feature extraction kernel of a neural network to obtain an output feature map, wherein the output feature map comprises a plurality of output sub-feature maps, wherein each of the plurality of output sub-feature maps is determined based on the corresponding input sub-feature map and the feature extraction kernel, wherein at least one of the output sub-feature maps is determined based on a target matrix obtained after an absolute value is taken, and wherein a difference between the target matrix and the input sub-feature map corresponding to the target matrix is the feature extraction kernel; and classify the to-be-processed image based on the output feature map to obtain a classification result of the to-be-processed image.

18. The chip of claim 17, wherein the target matrix is obtained by performing matrix addition or matrix subtraction on at least one of the input sub-feature maps and the feature extraction kernel.

19. The chip of claim 18, wherein the at least one of the output sub-feature maps is obtained according to the following formula:

$$Y(m, n, t) = \sum_{i=0}^{d-1}\sum_{j=0}^{d-1}\sum_{k=1}^{C} -|X(m+i, n+j, k) - F(i, j, k, t)|; \text{ or}$$

$$Y(m, n, t) = \sum_{i=0}^{d-1}\sum_{j=0}^{d-1}\sum_{k=1}^{C} -|X(m+i, n+j, k) + F(i, j, k, t)|,$$

wherein $|(\bullet)|$ is an operation for taking an absolute value, $\Sigma(\bullet)$ is a summation operation, Y(m,n,t) is the at least one of the output sub-feature maps, Y(m,n,t) is an element in an $m^{th}$ row and an $n^{th}$ column on a $t^{th}$ page in the output feature map, X(m+i,n+j,k) is an element determined based on an $i^{th}$ row and a $j^{th}$ column on a $k^{th}$ page in the at least one of the input sub-feature maps, F(i,j,k,t) is an element in an $i^{th}$ row and a $j^{th}$ column on a $k^{th}$ page in the feature extraction kernel, t is a channel quantity of the feature extraction kernel, d is a row quantity of the feature extraction kernel, C is a channel quantity of the input feature map, and d, C, i, j, k, m, n, and t are all integers.

20. The chip of claim 17, wherein a gradient of the feature extraction kernel is determined based on the target matrix, and a gradient of the input sub-feature map is determined based on the target matrix.

\* \* \* \* \*

UNITED STATES PATENT AND TRADEMARK OFFICE
CERTIFICATE OF CORRECTION

PATENT NO. : 12,131,521 B2
APPLICATION NO. : 17/587284
DATED : October 29, 2024
INVENTOR(S) : Hanting Chen, Yunhe Wang and Chunjing Xu Page 1 of 1

It is certified that error appears in the above-identified patent and that said Letters Patent is hereby corrected as shown below:

In the Claims

In Column 28, In Line 23-25 (Approx.), In Claim 3, delete

" $\frac{\partial Y(m,n,t)}{\partial F(i,j,k,t)} = -Hard\,\tanh(F(i,j,k,t) \pm X(m+i,n+j,k));$ " and insert -- $Y(m,n,t) = \sum_{i=0}^{d-1}\sum_{j=0}^{d-1}\sum_{k=1}^{C} -|X(m+i,n+j,k) - F(i,j,k,t)|$, or $Y(m,n,t) = \sum_{i=0}^{d-1}\sum_{j=0}^{d-1}\sum_{k=1}^{C} -|X(m+i,n+j,k) + F(i,j,k,t)|$ --.

In Column 28, In Line 54 (Approx.), In Claim 5, delete "X(m+i, n+j,k)" and insert -- X(m+i,n+j,k) --.

In Column 28, In Line 66, In Claim 6, delete "X(m+i,n+j, k)" and insert -- X(m+i,n+j,k) --.

In Column 29, In Line 5, In Claim 6, delete "wherein" and insert -- wherein: --.

In Column 30, In Line 7, In Claim 11, delete "F (i,j,k,t)" and insert -- F(i,j,k,t) --.

In Column 30, In Line 12, In Claim 11, delete "X(m+i, n+j,k)" and insert -- X(m+i,n+j,k) --.

In Column 30, In Line 33 (Approx.), In Claim 12, delete "wherein" and insert -- wherein: --.

Signed and Sealed this
Twenty-fifth Day of February, 2025

Coke Morgan Stewart
*Acting Director of the United States Patent and Trademark Office*